(12) United States Patent
Yamaguchi

(10) Patent No.: US 9,619,896 B2
(45) Date of Patent: Apr. 11, 2017

(54) ESTIMATING DEVICE AND ESTIMATION METHOD

(71) Applicant: FUJITSU LIMITED, Kawasaki-shi, Kanagawa (JP)

(72) Inventor: Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 14/850,298

(22) Filed: Sep. 10, 2015

(65) Prior Publication Data

US 2016/0125617 A1  May 5, 2016

(30) Foreign Application Priority Data

Oct. 29, 2014  (JP) .................................. 2014-220869

(51) Int. Cl.
*G06K 9/36*   (2006.01)
*G06T 7/20*   (2017.01)
(Continued)

(52) U.S. Cl.
CPC ............ *G06T 7/204* (2013.01); *G06K 9/4661* (2013.01); *G06K 9/6202* (2013.01);
(Continued)

(58) Field of Classification Search
CPC ..... G06T 7/204; G06T 7/0018; G06T 7/0044; G06T 2207/30244; G06K 9/4661; G06K 9/6202; H04N 5/145; H04N 13/0282
(Continued)

(56) References Cited

U.S. PATENT DOCUMENTS 5,173,949 A * 12/1992 Peregrim ............ G01S 13/9035
                                                      382/209
5,642,442 A *  6/1997 Morton ................ G06K 9/2018
                                                      382/168
(Continued)

FOREIGN PATENT DOCUMENTS

EP    1 970 860 A2    9/2008
JP    2000-88554      3/2000
(Continued)

OTHER PUBLICATIONS

Extended European Search Report issued Apr. 5, 2016 in Patent Application No. 15184208.5.
(Continued)

*Primary Examiner* — John Strege
(74) *Attorney, Agent, or Firm* — Oblon, McClelland, Maier & Neustadt, L.L.P.

(57) ABSTRACT

An estimation method executed by a computer includes: extracting, from an image, a plurality of characteristic points satisfying a certain requirement regarding changes in gray levels between the plurality of characteristic points and surrounding points; identifying, as map points from the plurality of characteristic points, characteristic points existing on planes, by excluding corners of an object depicted on the image; extracting, from another image, another plurality of characteristic points satisfying the certain requirement; executing matching of the another plurality of characteristic points with the map points based on a region including the map points; and estimating, based on results of the matching, a position and an orientation of an imaging device while the another image is captured.

20 Claims, 24 Drawing Sheets

(51) Int. Cl.
*H04N 5/14* (2006.01)
*H04N 13/02* (2006.01)
*G06K 9/46* (2006.01)
*G06K 9/62* (2006.01)
*G06T 7/00* (2017.01)

(52) U.S. Cl.
CPC .......... *G06T 7/0018* (2013.01); *G06T 7/0044* (2013.01); *H04N 5/145* (2013.01); *H04N 13/0282* (2013.01); *G06T 2207/30244* (2013.01)

(58) Field of Classification Search
USPC .................................. 382/209, 218, 291, 294
See application file for complete search history.

(56) References Cited

U.S. PATENT DOCUMENTS

| | | | | |
|---|---|---|---|---|
| 6,064,749 | A * | 5/2000 | Hirota | G06F 3/011 345/7 |
| 7,343,278 | B2 * | 3/2008 | Billinghurst | G06K 9/32 345/420 |
| 2006/0004280 | A1 | 1/2006 | Kotake et al. | |
| 2006/0120606 | A1 * | 6/2006 | Furuhashi | G06T 7/0042 382/190 |
| 2012/0249807 | A1 * | 10/2012 | Sugden | G06T 7/0042 348/207.1 |

FOREIGN PATENT DOCUMENTS

| | | |
|---|---|---|
| JP | 2005-326274 | 11/2005 |
| JP | 2011-145856 | 7/2011 |

OTHER PUBLICATIONS

Gustavo Teodoro Laureano, et al., "Topological Detection of Chessboard Pattern for Camera Calibration" Proceedings of the International Conference on Image Processing, Computer Vision, and Pattern Recognition (IPCV), XP055261045, Jul. 25, 2013, pp. 1-7.
D. Sinclair, et al., "Quantitative Planar Region Detection" International Journal of Computer Vision, Kluwer Academic Publishers, vol. 18, No. 1, XP000591465, Apr. 1, 1996, pp. 77-91.
José F. Martins, et al., "A Facade Tracking System for Outdoor Augmented Reality" 18th International Conference on Computer Graphics, Visualization and Computer Vision, XP 055261051, Feb. 4, 2010, pp. 113-120.
Hirotake Ishii et al. "Proposal and Evaluation of Decommissioning Support Method of Nuclear Power Plants using Augmented Reality", Journal of the Virtual Reality Society of Japan, vol. 13, No. 2, 2008, 12 pages ( with English Abstract).
Office Action mailed Dec. 13, 2016 in Australian Application No. 2015224394.

* cited by examiner

FIG. 2

| MAP POINT IDENTIFIER | THREE-DIMENSIONAL COORDINATES | TYPE | CHARACTERISTIC AMOUNT | IMAGE PATTERN TEMPLATE |
|---|---|---|---|---|
| Mid1 | (x1,y1,z1) | PLANAR PATTERN POINT | (M11,M12,⋯,M1n) | PI1 |
| Mid2 | (x2,y2,z2) | PLANAR PATTERN POINT | (M21,M22,⋯,M2n) | PI2 |
| Mid3 | (x3,y3,z3) | PHYSICAL CORNER POINT | (M31,M32,⋯,M3n) | PI3 |
| Mid4 | (x4,y4,z4) | PHYSICAL CORNER POINT | (M41,M42,⋯,M4n) | PI4 |
| Mid5 | (x5,y5,z5) | PLANAR PATTERN POINT | (M51,M52,⋯,M5n) | PI5 |
| Mid6 | (x6,y6,z6) | PHYSICAL CORNER POINT | (M61,M62,⋯,M6n) | PI6 |
| Mid7 | (x7,y7,z7) | PLANAR PATTERN POINT | (M71,M72,⋯,M7n) | PI7 |
| Mid8 | (x8,y8,z8) | PHYSICAL CORNER POINT | (M81,M82,⋯,M8n) | PI8 |
| ⋯ | ⋯ | ⋯ | ⋯ | ⋯ |

21

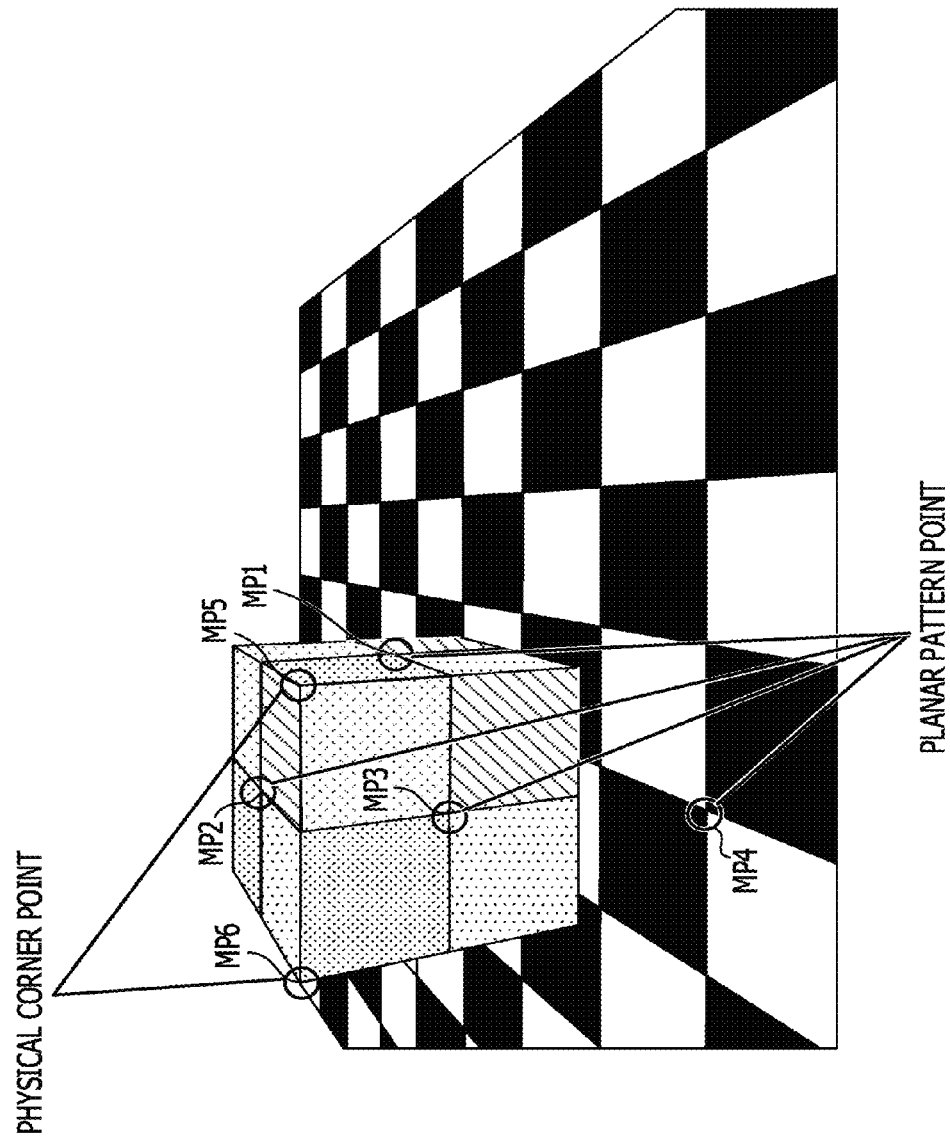

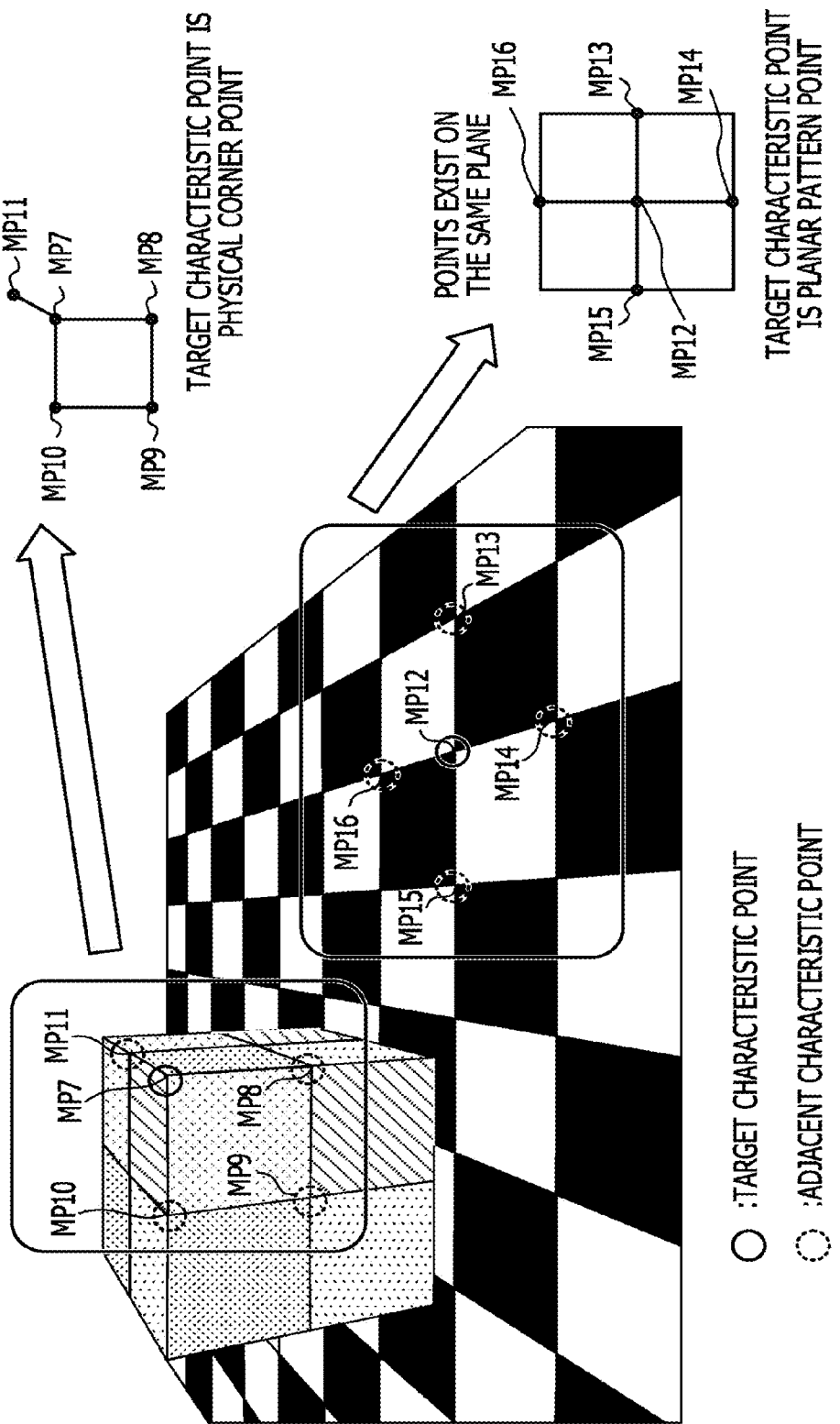

● THREE-DIMENSIONAL POINT $Sp_i = (x_i, y_i, z_i)$

◉ : PROJECTED POINT $Xp'_i = (u'_i, v'_i)$

FIG. 11

| MAP POINT IDENTIFIER | THREE-DIMENSIONAL COORDINATES | TYPE | PRIORITY | CHARACTERISTIC AMOUNT | IMAGE PATTERN TEMPLATE |
|---|---|---|---|---|---|
| Mid1 | (x1, y1, z1) | PLANAR PATTERN POINT | — | (M11, M12, ..., M1n) | PI1 |
| Mid2 | (x2, y2, z2) | PLANAR PATTERN POINT | — | (M21, M22, ..., M2n) | PI2 |
| Mid3 | (x3, y3, z3) | PHYSICAL CORNER POINT | 2.5 | (M31, M32, ..., M3n) | PI3 |
| Mid4 | (x4, y4, z4) | PHYSICAL CORNER POINT | 3.7 | (M41, M42, ..., M4n) | PI4 |
| Mid5 | (x5, y5, z5) | PLANAR PATTERN POINT | — | (M51, M52, ..., M5n) | PI5 |
| Mid6 | (x6, y6, z6) | PHYSICAL CORNER POINT | 0.8 | (M61, M62, ..., M6n) | PI6 |
| Mid7 | (x7, y7, z7) | PLANAR PATTERN POINT | — | (M71, M72, ..., M7n) | PI7 |
| Mid8 | (x8, y8, z8) | PHYSICAL CORNER POINT | 1.4 | (M81, M82, ..., M8n) | PI8 |
| ..... | ..... | ..... | ..... | ..... | ..... |

| SETTING NUMBER | MATCHING REQUIREMENT |
|---|---|
| 1 | C1 |
| 2 | C2 |
| ⋮ | ⋮ |

| TYPE | WEIGHT |
|---|---|
| PLANAR PATTERN POINT | W1 |
| PHYSICAL CORNER POINT | W2 |

ESTIMATING DEVICE AND ESTIMATION METHOD

CROSS-REFERENCE TO RELATED APPLICATION

This application is based upon and claims the benefit of priority of the prior Japanese Patent Application No. 2014-220869, filed on Oct. 29, 2014, the entire contents of which are incorporated herein by reference.

FIELD

The embodiments discussed herein are related to a technique for estimating the position and orientation of an imaging device.

BACKGROUND

In recent years, techniques related to augmented reality (AR) are actively being developed. AR is a collective term of techniques for expanding, by computers, real environments perceived by people.

As an example of AR, the following technique is known: the technique for using computer graphics or the like to superimpose additional information on an image (hereinafter referred to as acquired image) acquired by a camera connected to a mobile information terminal device such as a portable personal computer, a tablet, or a smartphone, displaying the acquired image and the additional information superimposed on the acquired image on a display screen of the mobile information terminal device, and achieving support for a user's task (refer to, for example, Hirotake Ishii, Proposal and Evaluation of Decommissioning Support Method of Nuclear Power Plants using Augmented Reality, Journal of the Virtual Reality Society of Japan, Vol. 13, No. 2, pp. 289-300, June, 2008).

In order to superimpose and display the additional information at an appropriate position, the position and orientation of the camera is estimated. The accuracy of the estimation is very important. As a method of estimating the position and orientation of the camera, techniques for estimating the position and orientation of the camera based on the acquired image are known.

As one of the techniques for estimating the position and orientation of the camera based on the acquired image, a method using characteristic points included in the acquired image is known (refer to, for example, Japanese Laid-open Patent Publication No. 2005-326274). Each of the characteristic points is normally a point detected as a standard by uniquely defining the position of the target point based on a variation in a gray level in a region located near the target point, while the variation in the gray level in the region located near the target point is large.

The method of estimating the position and orientation of the camera using the characteristic points is to estimate the position and orientation of the camera by using calculated three-dimensional coordinates of characteristic points (hereinafter referred to as map points) to associate the characteristic points within the acquired image to be processed with the map points in a matching process.

SUMMARY

According to an aspect of the invention, an estimation method executed by a computer includes: extracting, from an image, a plurality of characteristic points satisfying a certain requirement regarding changes in gray levels between the plurality of characteristic points and surrounding points; identifying, as map points from the plurality of characteristic points, characteristic points existing on planes, by excluding corners of an object depicted on the image; extracting, from another image, another plurality of characteristic points satisfying the certain requirement; executing matching of the another plurality of characteristic points with the map points based on a region including the map points; and estimating, based on results of the matching, a position and an orientation of an imaging device while the another image is captured.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a configuration of a map point information storage unit according to the first embodiment;

FIG. 3 is a diagram describing the types of characteristic points;

FIG. 5 is a diagram describing an example of a method of identifying the types according to the first embodiment;

FIG. 11 is a diagram illustrating an example of a configuration of a map point information storage unit according to the second embodiment;

FIG. 12 is a diagram illustrating an example of a configuration of a matching requirement storage unit according to the second embodiment;

FIG. 19 is a diagram illustrating an example of a configuration of a weight information storage unit according to the third embodiment;

DESCRIPTION OF EMBODIMENTS

The characteristic points, however, include a characteristic point located near a region in which a variation in a gray level due to a movement of the camera is small and a characteristic point located near a region in which a variation in a gray level due to the movement of the camera is large. A rate at which the characteristic point located near the region in which the variation in the gray level due to the movement camera is small causes erroneous matching in the matching process is low. In addition, the characteristic point located near the region in which the variation in the gray level due to the movement camera is small is easily detected, and the accuracy of detecting the position of the characteristic point located near the region in which the variation in the gray level due to the movement camera is small is high.

On the other hand, a rate at which the characteristic point located near the region in which the variation in the gray level due to the movement camera is large causes erroneous matching in the matching process is high, and the accuracy of detecting the position of the characteristic point located near the region in which the variation in the gray level due to the movement camera is large is low. Thus, the characteristic points include the characteristic point that causes erroneous matching at a high rate.

In a method disclosed in Japanese Laid-open Patent Publication No. 2005-326274, the position and orientation of the camera are estimated while all the characteristic points detected from the acquired image are treated in the same manner. Thus, the accuracy of estimating the position and orientation of the camera may be reduced due to erroneous matching.

According to an aspect, techniques disclosed in embodiments include an estimating device intended to improve the accuracy of estimating the position and orientation of a camera by reducing an effect of erroneous matching.

Embodiments of the disclosure are described in detail with reference to the accompanying drawings.

First Embodiment

Figure 1:
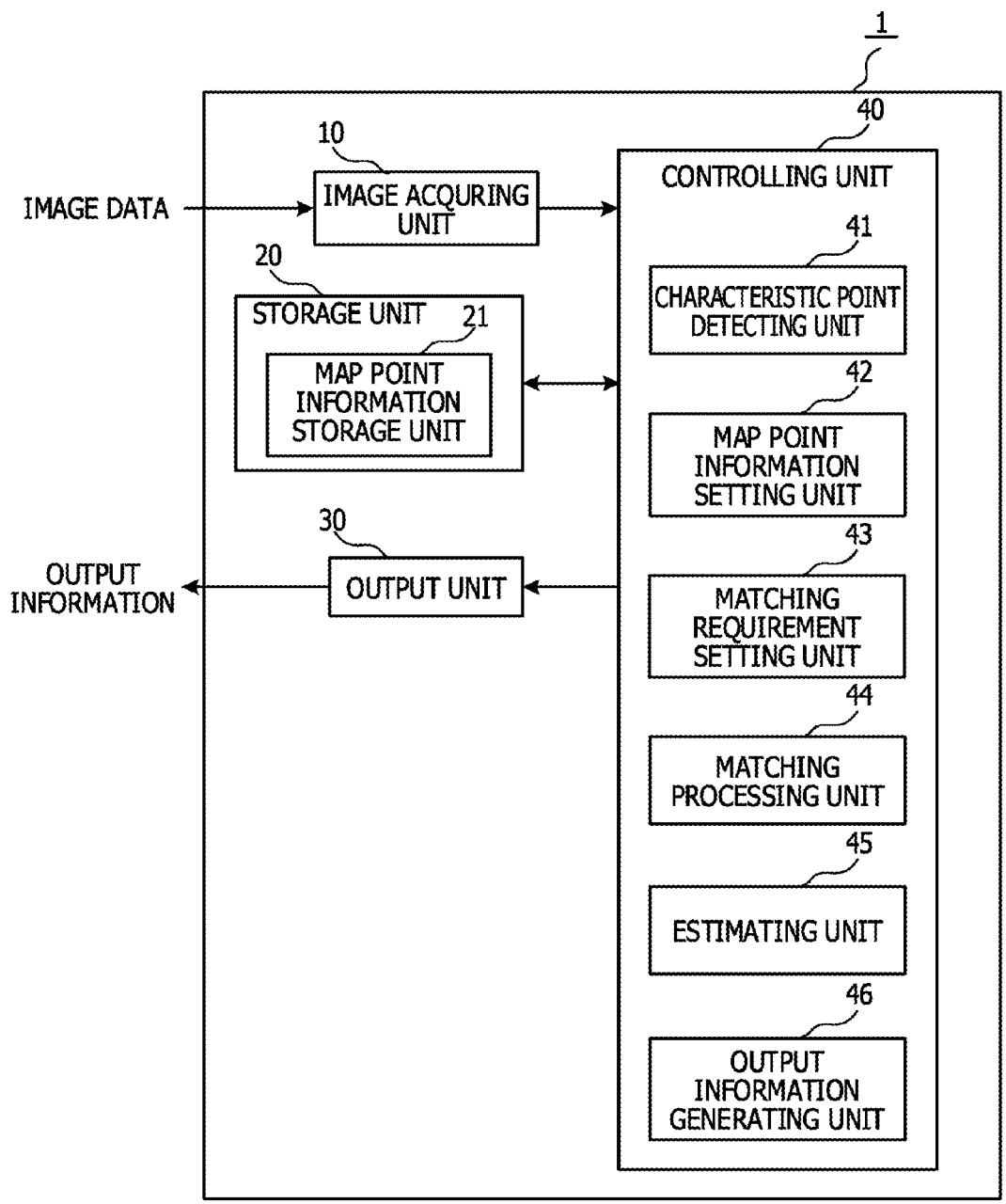
FIG. 1 is a functional block diagram illustrating an example of a configuration of a communication device according to a first embodiment.

FIG. 1 is a functional block diagram illustrating an example of a configuration of a communication device 1 according to a first embodiment. The communication device 1 according to the first embodiment is an estimating device configured to estimate the position and orientation of a camera (not illustrated) by associating characteristic points within an acquired image to be processed with map points held in advance in a matching process. The communication device 1 according to the first embodiment includes an image acquiring unit 10, a storage unit 20, an output unit 30, and a controlling unit 40, as illustrated in FIG. 1.

The image acquiring unit 10 includes a device interface, a communication module, or the like, for example. The image acquiring unit 10 sequentially acquires images acquired by the connected imaging device (camera). The image acquiring unit 10 outputs the acquired images to the controlling unit 40. In this case, the image acquiring unit 10 may cause the acquired images to be temporarily stored in a frame memory (not illustrated), and the controlling unit 40 may sequentially acquire the acquired images from the frame memory in coordination with the timing of executing a process.

The storage unit 20 includes a random access memory (RAM), a read only memory (ROM), a hard disk drive (HDD), and the like, for example. The storage unit 20 functions as, for example, a work area of a central processing unit (CPU) included in the controlling unit 40, a program area for storing various programs such as an operation program for controlling the overall communication device 1, and a data area for storing data of various types, for example.

In addition, the storage unit 20 functions as a map point information storage unit 21, as illustrated in FIG. 1. The map point information storage unit 21 stores information (hereinafter referred to as map point information) on map points, while the map point information is associated with the map points in the map point information storage unit 21. The map points are three-dimensional characteristic points and are candidates for points to be subjected to matching with characteristic points on an acquired image, as described above.

FIG. 2 is a diagram illustrating an example of a configuration of the map point information storage unit 21 according to the first embodiment. The map point information storage unit 21 stores, as a table, the multiple map points and the map point information on the map points, as illustrated in FIG. 2, for example. The map point information storage unit 21 according to the first embodiment stores "map point identifiers", "three-dimensional coordinates", "types", "characteristic amounts", and "image pattern templates", while the "map point identifiers" are associated with the "three-dimensional coordinates", the "types", the "characteristic amounts", and the "image pattern templates" in the map point information storage unit 21. The map point information of the various types that is stored in the map point information storage unit 21 is extracted from the acquired image, as described later. If CAD data to be acquired exists, the map point information may be extracted from the CAD data and stored in advance.

The "map point identifiers" are identifiers that uniquely identify the map points. The "three-dimensional coordinates" are three-dimensional coordinates of the corresponding map points in a world coordinate system and are calculated by a map point information setting unit 42 (described later). The "types" are the types of the corresponding map points and are identified by the map point information setting unit 42.

The "characteristic amounts" are obtained by converting characteristics of variations in gray levels in regions located near the corresponding map points into numerical vector quantities and are used in the matching process. The "image pattern templates" are image data of the regions located near the corresponding map points and are used in the matching process so as to enable the matching of the characteristic points with the map points to be effectively executed using correlations.

In the first embodiment, the types of the map points (characteristic points) are two types, "planar pattern points" and "physical corner points". The "planer pattern points" are characteristic points located on planes excluding corners, while the "physical corner points" are characteristic points other than the "planar pattern points" or are characteristic points located at the corners of the planes, such as corners of an object.

FIG. 3 is a diagram describing the types of the characteristic points. As illustrated in FIG. 3, characteristic points MP1 to MP4 are located on planes excluding corners and are thus planer pattern points, while characteristic points MP5 and MP6 are located at corners of an object (cube) and are thus physical corner points.

Figure 4A:
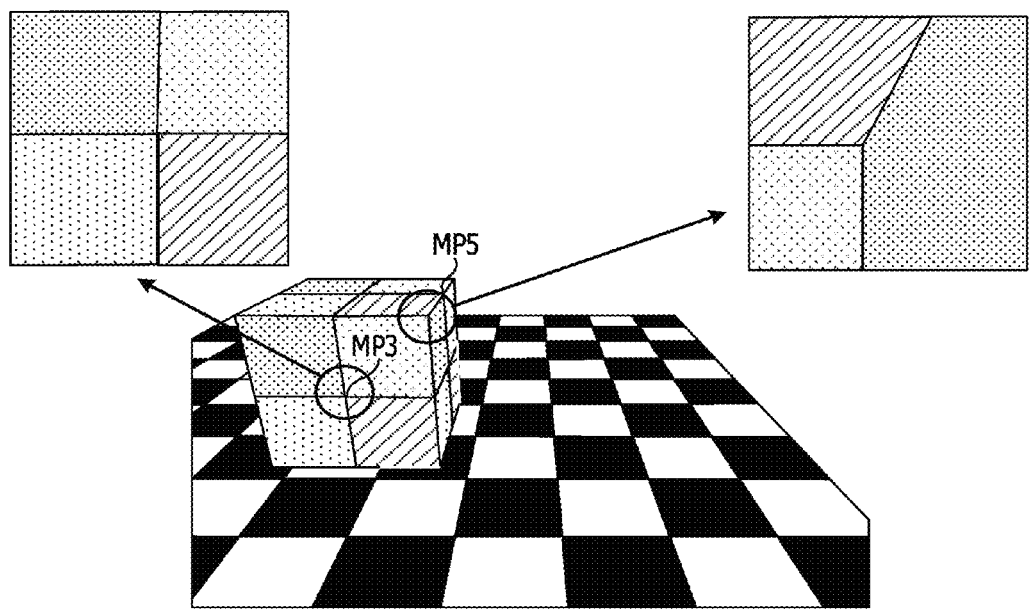
FIGS. 4A and 4B are diagrams describing characteristics of the types.
Figure 4B:
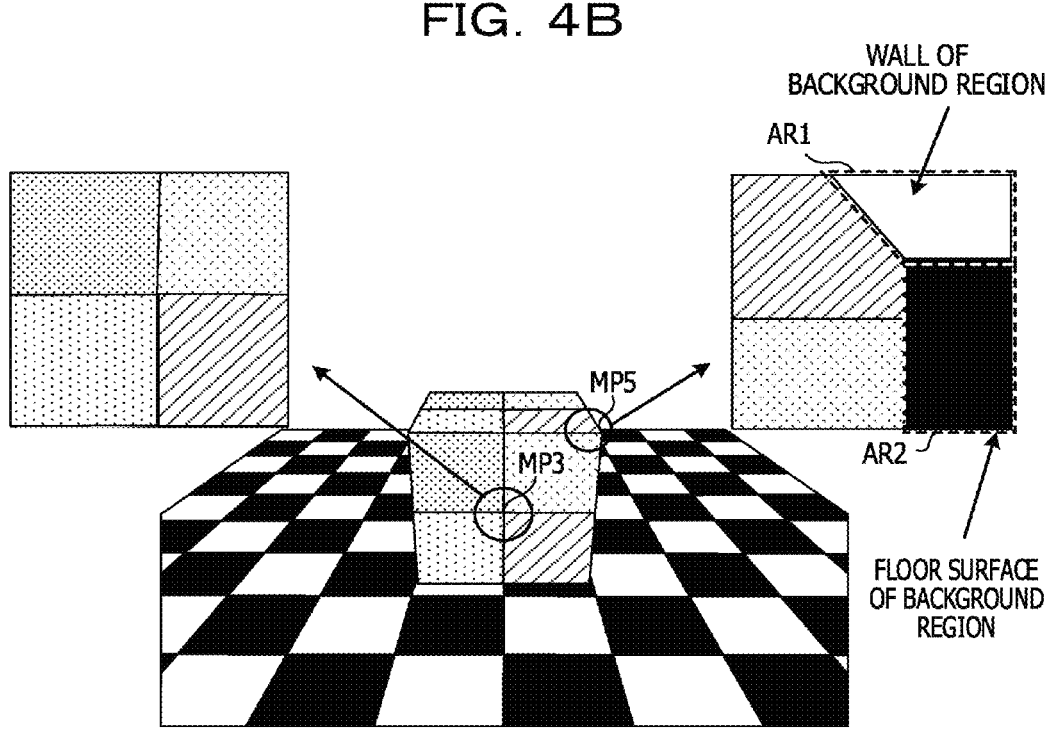

FIGS. 4A and 4B are diagrams describing characteristics of the map points (characteristic points) of the types and describing changes in characteristics of variations in gray levels in regions located near the characteristic points MP3 and MP5 when the position and orientation of the camera are changed.

When the position and orientation of the camera are changed and an acquired image is changed from an image illustrated in FIG. 4A to an image illustrated in FIG. 4B, changes in characteristics of variations in gray levels in regions located near the characteristic point MP3 that is the planar pattern point are small, as illustrated in FIGS. 4A and 4B. In this manner, changes in characteristics of variations in gray levels in regions located near the characteristic points that are planer pattern points due to a movement of the camera are small. On the other hand, changes in characteristics of variations in gray level in regions located near the characteristic point MP5 that is the physical corner point are very large, as illustrated in FIGS. 4A and 4B. This is due to the fact that physical occlusion occurs due to changes in the position and orientation of the camera or a right side surface of the object (cube) is hidden by a front surface of the object and a wall of a background region is imaged in a region located near the characteristic point MP5. In this manner, changes in characteristics of variations in gray levels in regions located near characteristic points that are physical corner points due to the movement of the camera are large.

Return to FIG. 1. The output unit 30 includes a device interface, a communication module, or the like, for example. The output unit 30 outputs information generated by an output information generating unit 46 (described later in detail) to a connected display device (not illustrated).

The controlling unit 40 includes a CPU and the like and executes the operation program stored in the program area of the storage unit 20 so as to function as a characteristic point detecting unit 41, the map point information setting unit 42, a matching requirement setting unit 43, a matching processing unit 44, an estimating unit 45, and the output information generating unit 46, as illustrated in FIG. 1. In addition, the controlling unit 40 executes the operation program and executes a process of controlling the overall communication device 1, a process (described later in detail) of setting map point information, and the like.

The characteristic point detecting unit 41 analyzes an input acquired image and detects, as characteristic points, points whose positions on the image are uniquely defined based on variations in gray levels in regions located near the target points, while the variations in the gray levels in the regions located near the target points are large. For the detection of the characteristic points, an arbitrary technique such as Harris operator or Feature from Accelerated Segment Test (FAST) characteristic detection may be used. In the following description, the characteristic points detected on the acquired image by the characteristic point detecting unit 41 are also referred to as detected points.

The map point information setting unit 42 sets the map point information storage unit 21. Specifically, the map point information setting unit 42 uses a stereo matching method such as a sequential similarity detection algorithm or an area correlation method to execute the matching of characteristic points detected by the characteristic point detecting unit 41 and located on two acquired images. Then, the map point information setting unit 42 calculates three-dimensional coordinates of successfully matched characteristic points by a stereo process.

Then, the map point information setting unit 42 detects positional relationships between the successfully matched characteristic points (target characteristic points) and characteristic points (hereinafter referred to as adjacent characteristic points) located adjacent to the target characteristic points. In this case, the map point information setting unit 42 selects a predetermined number (for example, 3 or more) of characteristic points located adjacent to each of the target characteristic points in ascending order of distance between the target characteristic point and characteristic points located adjacent to the target characteristic point, for example. Then, the map point information setting unit 42 identifies the types of the successfully matched characteristic points. Specifically, if a target characteristic point and selected characteristic points located adjacent to the target characteristic point are distributed on the same plane, the map point information setting unit 42 identifies that the type of the target characteristic point is a "planar pattern point". On the other hand, if the target characteristic point and the selected characteristic points located adjacent to the target characteristic point are not distributed on the same plane, the map point information setting unit 42 identifies that the type of the target characteristic point is a "physical corner point".

Furthermore, the map point information setting unit 42 calculates characteristic amounts of the successfully matched characteristic points and generates image pattern templates for the successfully matched characteristic points. Then, the map point information setting unit 42 associates map point information (three-dimensional coordinates, types, characteristic amounts, and image pattern templates) with map point identifiers and causes the map point information and the map point identifiers to be stored in the map point information storage unit 21.

A method of identifying the types of map points (characteristic points) according to the first embodiment is described using a specific example with reference to FIG. 5. FIG. 5 is a diagram describing an example of the method of identifying the types according to the first embodiment.

If characteristic points MP8 to MP11 are selected by the map point information setting unit 42 as characteristic points located adjacent to a target characteristic point MP7, the target characteristic point MP7 and the adjacent characteristic points MP8 to MP11 are not distributed on the same plane, as illustrated in FIG. 5. In this case, the map point information setting unit 42 identifies that the type of the target characteristic point MP7 is a "physical corner point".

On the other hand, if characteristic points MP13 to MP16 are selected by the map point information setting unit 42 as characteristic points located adjacent to a target characteristic point MP12, all the target characteristic point MP12 and the adjacent characteristic points MP13 to MP16 are distributed on the same plane. In this case, the map point information setting unit 42 identifies that the type of the target characteristic point MP12 is a "planar pattern point".

Return to FIG. 1. The matching requirement setting unit 43 sets a matching requirement such as a requirement to select map points to be subjected to matching with characteristic points (detected points) detected by the characteristic point detecting unit 41 and located on an acquired image. In the first embodiment, the matching requirement setting unit 43 sets, as the matching requirement, a requirement to select map points whose types are "planar pattern points". Thus, the matching may be executed on points excluding "physical corner points" located near regions in which changes in characteristics of variations in gray levels due to a movement of the camera are large, and erroneous matching may be suppressed.

The matching processing unit 44 selects the map points in accordance with the matching requirement (selection requirement in the first embodiment) set by the matching requirement setting unit 43 and executes the matching of the characteristic points (detected points) detected by the characteristic point detecting unit 41 and located on the acquired image with the selected map points. Specifically, the matching processing unit 44 executes the matching of the characteristic points (detected points) with the map points based on either characteristic amounts stored in the map point information storage unit 21 or image pattern templates stored in the map point information storage unit 21 or based on both characteristic amounts stored in the map point information storage unit 21 and image pattern templates stored in the map point information storage unit 21. As a method of the matching, various methods such as a frame-to-frame tracking method, a detection method, and a method using the frame-to-frame tracking method and the detection method may be used.

In the first embodiment, since the matching requirement setting unit 43 sets, as the matching requirement, the requirement to select map points whose types are planar pattern points and that are to be subjected to the matching, the matching processing unit 44 selects, from among map points stored in the map point information storage unit 21, map points whose types are "planar pattern points" and executes the matching of the selected map points with the detected points. Thus, the matching may be executed on points excluding "physical corner points" located near regions in which changes in characteristics of variations in gray levels due to a movement of the camera are large, and erroneous matching may be suppressed.

Figure 6A:
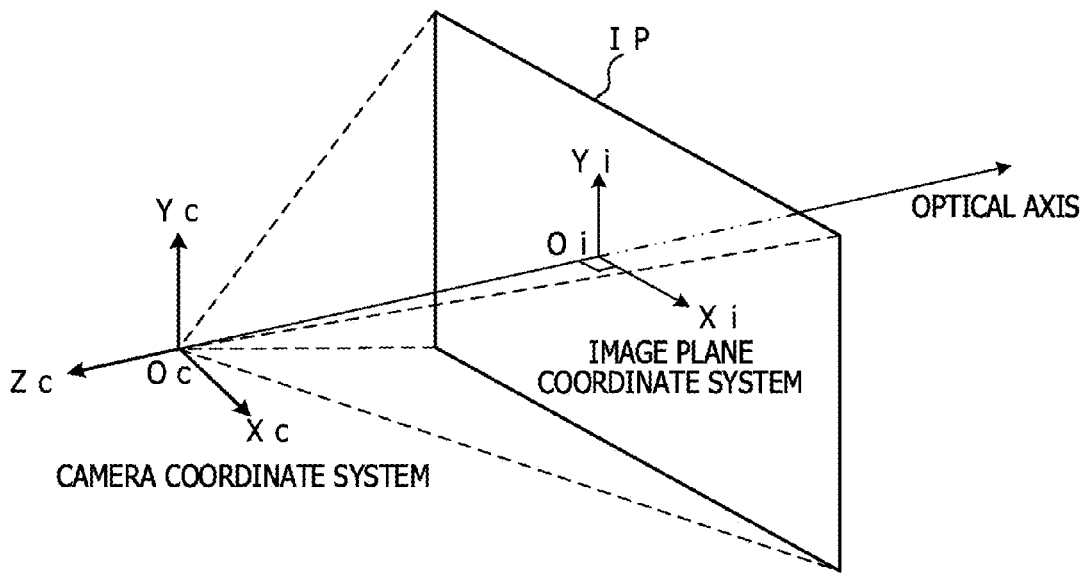
FIG. 6A is a diagram describing a camera coordinate system and an image plane coordinate system.

Coordinate systems including a camera coordinate system, and relationships between a characteristic point (hereinafter referred to as a three-dimensional point) on an object existing in the real world (world coordinate system) and to be imaged and a point (hereinafter referred to as a projected point) obtained by projecting a corresponding three-dimensional point on an acquired image, are briefly described with reference to FIGS. 6A and 6B. FIG. 6A is a diagram describing the camera coordinate system and an image plane coordinate system, while FIG. 6B is a diagram describing the projected point.

Referring to FIG. 6A, the origin Oi of the image plane coordinate system is located at a point intersecting with an optical axis and an image plane IP indicating the acquired image, Xi axis indicates a horizontal direction of the image plane IP, and Yi axis indicates a vertical direction of the image plane IP. In addition, the origin Oc of the camera coordinate system is located at a light spot of the camera, Zc axis of the camera coordinate system indicates a direction opposite to the optical axis, Xc axis of the camera coordinate system indicates a direction parallel to the horizontal direction of the image plane IP, and Yc axis of the camera coordinate system indicates a direction parallel to the vertical direction of the image plane IP.

Figure 6B:
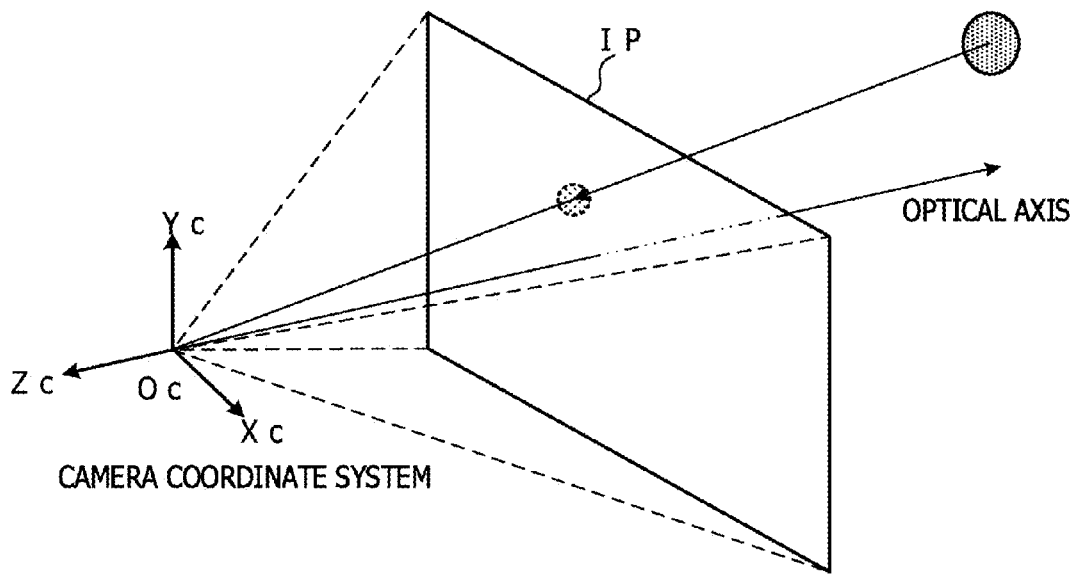
FIG. 6B is a diagram describing a projected point.

Referring to FIG. 6B, a point that intersects with the image plane IP and a line connecting the origin Oc (light spot of the camera) of the camera coordinate system with a three-dimensional point Spi=(xi, yi, zi) is a projected point Xp'i=(u'i, v'i) corresponding to the three-dimensional point Spi. Specifically, the origin Oc of the camera coordinate system, the projected point Xp'i of the image plane coordinate system, and the three-dimensional point Spi of the world coordinate system satisfy a collinear constraint.

Return to FIG. 1. The estimating unit 45 estimates the position and orientation of the camera based on successfully matched pairs of map points subjected to the matching by the matching processing unit 44 and characteristic points (detected points) subjected to the matching by the matching processing unit 44. Specifically, the estimating unit 45 estimates the position and orientation of the camera in accordance with a conventional technique by calculating a camera orientation matrix M that minimizes the sum of the squares of distances between the characteristic points (detected points) and points obtained by projecting the corresponding map points on the acquired image or minimizes the sum E of the squares of deviations of the characteristic points (detected points) from the points obtained by projecting the map points. The average of the deviations, the sum of the deviations, or the like may be used instead of the sum of the squares of the deviations.

If coordinates of successfully matched characteristic points (detected point) are Xpi=(ui, vi), and coordinates of points obtained by projecting corresponding map points are Xp'i=(u'i, v'i), the sum E of the squares of deviations of the successfully matched characteristic points (detected points) from the points obtained by projecting the corresponding map points may be expressed by the following Equation 1.

$$E=\Sigma|Xpi-Xp'i|^2 \quad \text{(Equation 1)}$$

Figure 7:
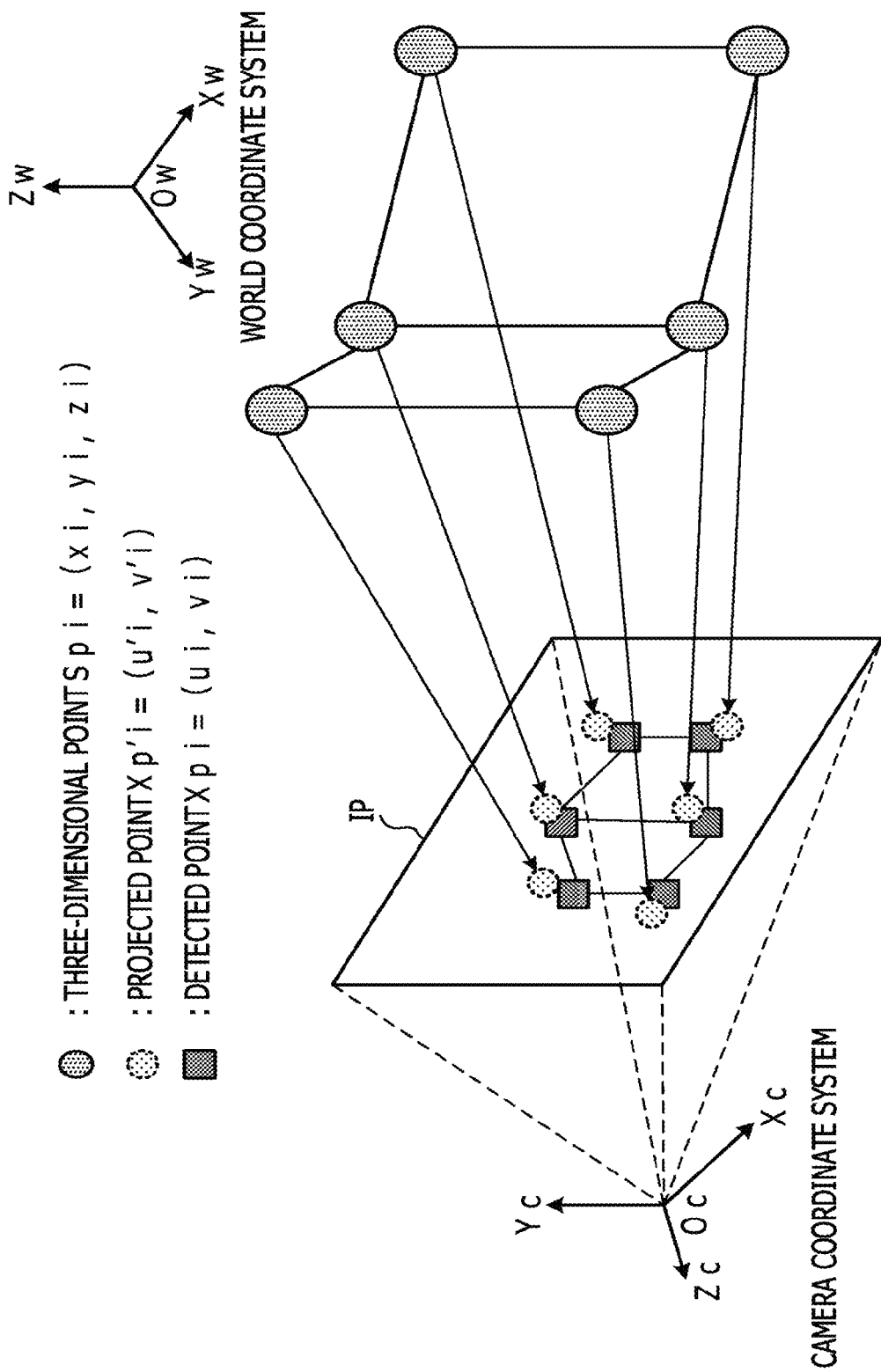
FIG. 7 is a diagram describing an example of a method of estimating the position and orientation of a camera according to the first embodiment.

FIG. 7 is a diagram describing an example of a method of estimating the position and orientation of the camera according to the first embodiment. In the example illustrated in FIG. 7, the following relationships are schematically illustrated: the relationships between three-dimensional points Sp1 to Sp6 that are map points, points Xp'1 to Xp'6 obtained by projecting the map points, and characteristic points (detected points) Xp1 to Xp6 successfully matched with the three-dimensional points Sp1 to Sp6 and located on an acquired image.

Return to FIG. 1. The output information generating unit 46 generates, based on the position and orientation of the camera that have been estimated by the estimating unit 45, information that is to be output and indicates details to be superimposed and displayed on an acquired image displayed on a display screen of the display device (not illustrated).

Figure 8:
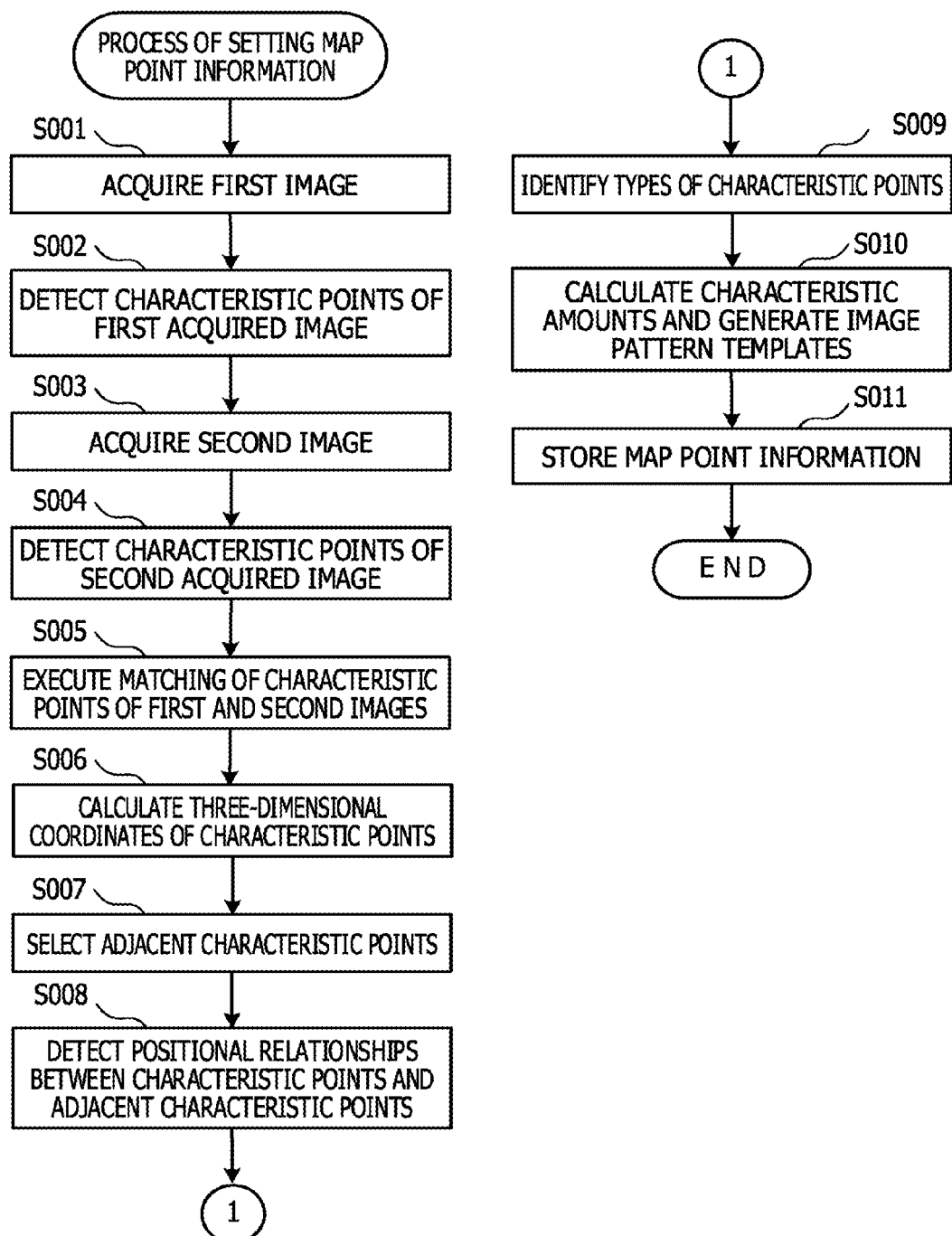
FIG. 8 is an example of a flowchart describing a process of setting map point information according to the first embodiment.

Next, the flow of a process of setting map point information according to the first embodiment is described with reference to FIG. 8. FIG. 8 is an example of a flowchart of the process of setting map point information according to the first embodiment. The process of setting map point information is started by a predetermined operation (the activation of a specific application or the like) performed by a user through an operating unit (not illustrated) as a trigger, for example. The process of setting map point information may be repeatedly executed at predetermined time intervals or every time an acquired image is received.

The image acquiring unit 10 acquires a first image and outputs the first acquired image to the controlling unit 40 (in step S001). The characteristic point detecting unit 41 detects characteristic points of the first input acquired image (in step S002).

Then, the image acquiring unit 10 acquires a second image and outputs the second acquired image to the controlling unit 40 (in step S003). The characteristic point detecting unit 41 detects characteristic points of the second input acquired image (in step S004).

Then, the map point information setting unit 42 executes stereo matching on the characteristic points of the first and second acquired images (in step S005) and calculates three-dimensional coordinates of successfully matched characteristic points (in step S006). Then, the map point information setting unit 42 selects a predetermined number of characteristic points located adjacent to each of the successfully matched characteristic points (in step S007) and detects positional relationships between the successfully matched characteristic points and the characteristic points located adjacent to the successfully matched characteristic points (in step S008).

Then, the map point information setting unit 42 identifies the types of the successfully matched characteristic points (in step S009). Then, the map point information setting unit 42 calculates characteristic amounts of the successfully matched characteristic points and generates image pattern templates for the successfully matched characteristic points (in step S010).

Then, the map point information setting unit 42 associates map point information (the three-dimensional coordinates, the types, the characteristic amounts, and the image pattern templates) with map point identifiers and causes the map point information and the map point identifiers to be stored in the map point information storage unit 21 (in step S011). Then, this process is terminated.

Figure 9:
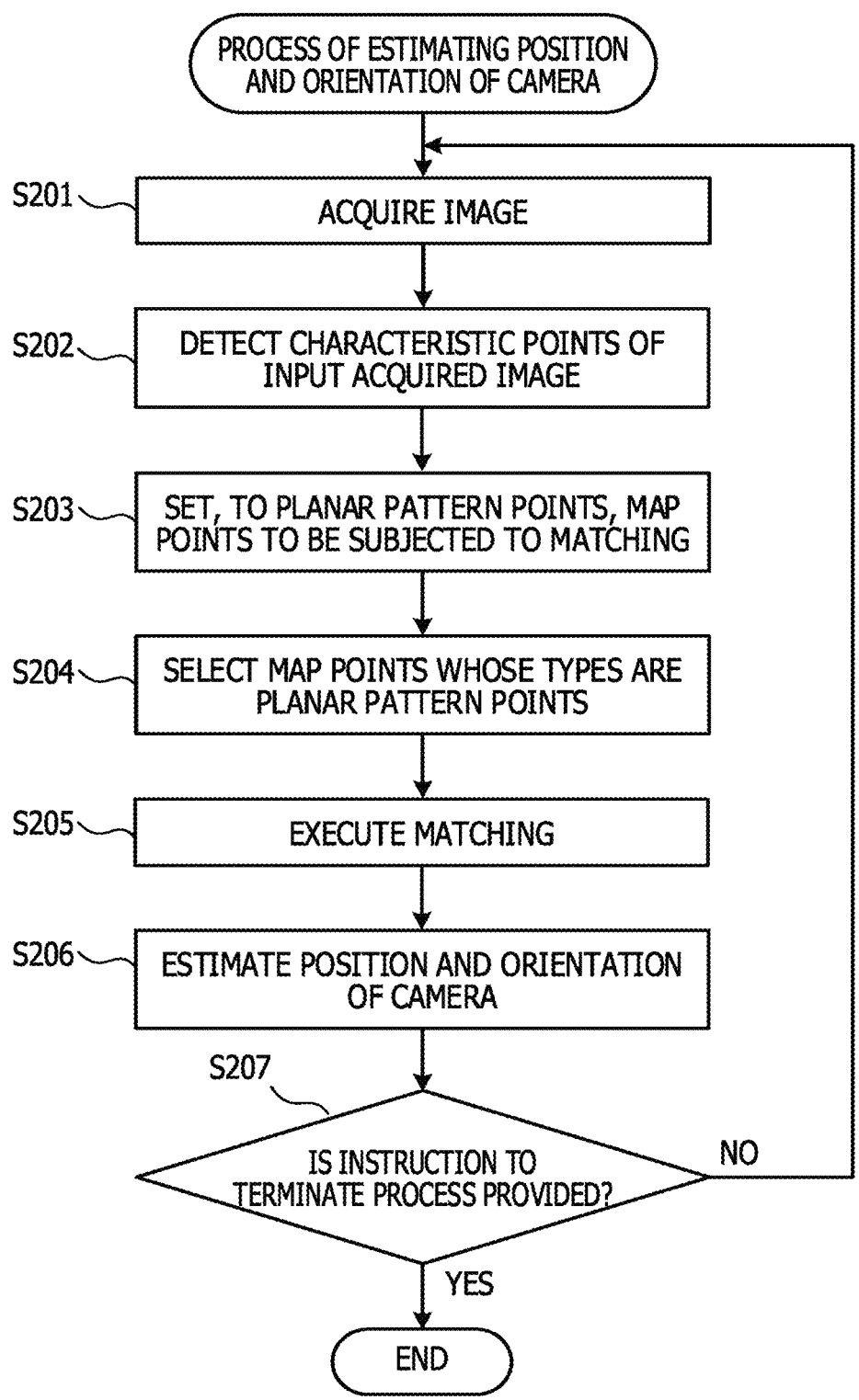
FIG. 9 is an example of a flowchart describing a process of estimating the position and orientation of the camera according to the first embodiment.

Next, the flow of a process of estimating the position and orientation of the camera according to the first embodiment is described with reference to FIG. 9. FIG. 9 is an example of a flowchart of the process of estimating the position and orientation of the camera according to the first embodiment. The process of estimating the position and orientation of the camera according to the first embodiment is started when the process of setting map point information is executed and the map point information is stored in the map point information storage unit 21 as a trigger, for example.

The image acquiring unit 10 acquires an image and outputs the acquired image to the controlling unit 40 (in step S201). Then, the characteristic point detecting unit 41 detects characteristic points of the input acquired image (in step S202). Then, the matching requirement setting unit 43 sets the matching requirement to select map points whose types are "plane pattern points" and that are to be subjected to the matching (in step S203).

The matching processing unit 44 selects the map points whose types are the plane pattern points (in step S204) and executes the matching of the detected characteristic points (detected points) with the selected map points (in step S205). Then, the estimating unit 45 estimates the position and orientation of the camera based on successfully matched pairs of map points and characteristic points (detected points) (in step S206).

Then, the controlling unit 40 determines whether or not an instruction to terminate the process is provided (in step S207). For example, the controlling unit 40 determines whether or not a predetermined operation (for example, the termination of the application) is performed by the user through the operating unit (not illustrated) and thereby determines whether or not the instruction to terminate the process is provided. If the controlling unit 40 determines that the instruction to terminate the process is yet to be provided (NO in step S207), the process returns to step S201 and the aforementioned processes are repeated. On the other hand, if the controlling unit 40 determines that the instruction to terminate the process is provided (YES in step S207), the process is terminated.

According to the first embodiment, the communication device 1 identifies the types of map points to be subjected to the matching with characteristic points (detected points) on an acquired image and selects, from among the map points, map points whose types are planer pattern points. Then, the communication device 1 executes the matching of the characteristic points (detected points) with the selected map points and estimates the position and orientation of the camera based on deviations of successfully matched characteristic points (detected points) from points obtained by projecting successfully matched map points. Specifically, physical corner points that are likely to cause erroneous matching are excluded from the points to be subjected to the matching, and rates of causing physical corner points to contribute to the estimation of the position and orientation of the camera are 0. Thus, erroneous matching may be suppressed and the accuracy of estimating the position and orientation of the camera may be improved.

In addition, according to the first embodiment, the communication device 1 executes the stereo matching on two acquired images and calculates three-dimensional coordinates of detected characteristic points. Then, the communication device 1 identifies the types of the characteristic points based on positional relationships between each of the characteristic points and a predetermined number of characteristic points located adjacent to the target characteristic point.

Second Embodiment

In the first embodiment, only map points whose types are planer pattern points are subjected to the process of executing the matching of characteristic points (detected points) detected on an acquired image with map points. In a second embodiment, if the number of successfully matched pairs of map points and characteristic points (detected points) is smaller than a predetermined threshold Z (described later in detail), the matching requirement is adjusted so as to ensure that the number of successfully matched pairs is equal to or larger than the predetermined threshold Z and that a map point whose type is a physical corner point is subjected to the matching.

Thus, the number of successfully matched pairs, to be used upon the estimation, of characteristic points (detected points) and map points may be maintained at a value equal to or larger than a predetermined number. Even if the number of planar pattern points is small and it is predicted to reduce the accuracy of estimating the position and orientation of the camera, the accuracy of the estimation may be improved.

Figure 10:
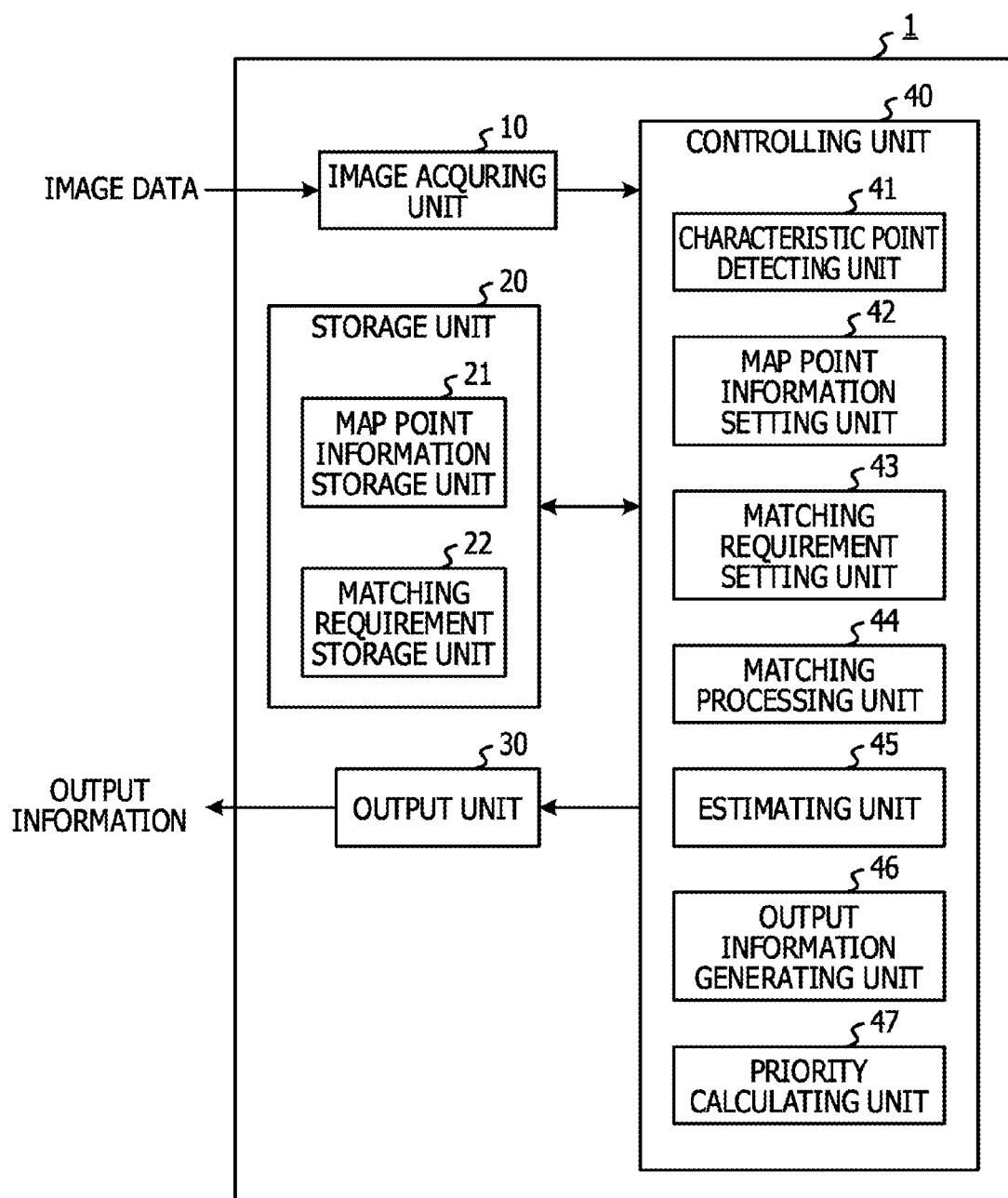
FIG. 10 is a functional block diagram illustrating an example of a configuration of a communication device according to a second embodiment.

FIG. 10 is a functional block diagram illustrating an example of a configuration of a communication device 1 according to the second embodiment. A basic configuration of the communication device 1 according to the second embodiment is the same as the basic configuration described in the first embodiment. As illustrated in FIG. 10, however, the second embodiment is different from the first embodiment in that the storage unit 20 further functions as a matching requirement storage unit 22 and that the controlling unit 40 further functions as a priority calculating unit 47. In addition, the second embodiment is different from the first embodiment in that the map point information storage unit 21 further stores information of priorities. Furthermore, functions of the map point information setting unit 42, matching requirement setting unit 43, and matching processing unit 44 are slightly different from those described in the first embodiment.

A configuration of the map point information storage unit 21 according to the second embodiment is described with reference to FIG. 11. FIG. 11 is a diagram illustrating an example of the configuration of the map point information storage unit 21 according to the second embodiment. As illustrated in FIG. 11, the map point information storage unit 21 according to the second embodiment further stores "priorities" for map points whose types are physical corner points, while the "priorities" are associated with the identifiers of the map points. Thus, as map points to be subjected to the matching, map points whose types are physical corner points may be selected based on the priorities.

The "priorities" are a criterion to be used for the matching processing unit 44 to select map points whose types are physical corner points. The "priorities" are calculated by the priority calculating unit 47. In the second embodiment, the higher values of the priorities, the higher the priorities. The priorities are described later.

Next, a configuration of the matching requirement storage unit 22 is described with reference to FIG. 12. FIG. 12 is a diagram illustrating an example of the configuration of the matching requirement storage unit 22 according to the second embodiment. The matching requirement storage unit 22 stores information as a table, as illustrated in FIG. 12, for example. The matching requirement setting unit 43 references the matching requirement storage unit 22 in order to set a matching requirement such as a requirement to select map points. As illustrated in FIG. 12, the matching requirement storage unit 22 stores setting numbers and matching requirements associated with the setting numbers.

Each of the "setting numbers" indicates the number of times when a matching requirement is set. If a matching requirement is set for the second time, the matching requirement setting unit 43 sets a matching requirement associated with a setting number "2". In the second embodiment, a matching requirement (associated with a setting number "1") initially set is a requirement to select map points whose types are "planar pattern points" and that are to be subjected to the matching.

The "matching requirements" are related to the matching process and are requirements such as a requirement to select map points whose types are physical corner points and that are to be subjected to the matching. A matching requirement may be a requirement to select a predetermined number of physical corner points in descending order of priority, for example. In addition, the matching requirement may be a requirement to randomly select a predetermined number of physical corner points regardless of priorities, for example. In addition, the matching requirement may be a requirement to select physical corner points having priorities equal to or larger than a predetermined value, for example. In addition, the matching requirement may be a requirement that reduces a threshold for similarities between characteristic points (detected points) and map points, while the threshold is used to determine whether or not the characteristic points (detected points) successfully match the map points in the matching process, for example. The predetermined number may be a fixed value or may be variable (for example, may be reduced) based on a setting number. It is preferable that physical corner points be selected in descending order of priority, since the priorities are set to ensure that the smaller a change in a characteristic of a variation in a gray level in a region located near a physical corner point due to a movement of the camera, the higher a priority of the physical corner point. The matching requirements are set to ensure that the higher a setting number, the more a matching requirement associated with the setting number is relaxed.

Return to FIG. 10. The controlling unit 40 includes a CPU and the like, for example. The controlling unit 40 executes the operation program stored in the program area of the storage unit 20 and achieves functions as the characteristic point detecting unit 41, the map point information setting unit 42, the matching requirement setting unit 43, the matching processing unit 44, the estimating unit 45, the output information generating unit 46, and the priority calculating unit 47, as illustrated in FIG. 10. In addition, the controlling unit 40 executes the operation program and executes a process of controlling the overall communication device 1, a process (described later) of setting map point information, and the like.

The priority calculating unit 47 calculates distortions (warpage) of shapes located near map points (characteristic points) whose types are physical corner points and calculates, based on the calculated distortions (warpage), priorities of the map points (characteristic points) whose types are physical corner points. Specifically, the priority calculating unit 47 extracts, for each physical corner point, map points (characteristic points) separated by a predetermined distance or less from the physical corner point (target physical corner point) and arbitrarily selects a predetermined number (for example, three) of map points (characteristic points) from among the extracted map points (characteristic points) for each physical corner point.

Then, the priority calculating unit 47 detects, for each selected combination of map points, positional relationships between the map points (characteristic points) and a target physical corner point. Then, the priority calculating unit 47 calculates angles θ formed between a plane on which other map points (characteristic points) and the target physical corner point are distributed and lines connecting the target physical corner point to map points (characteristic points) that are not distributed on the plane. The priority calculating unit 47 calculates the average of the angles. Specifically, the priority calculating unit 47 calculates a distortion (warpage) of a shape located near the target physical corner point.

Figure 13:
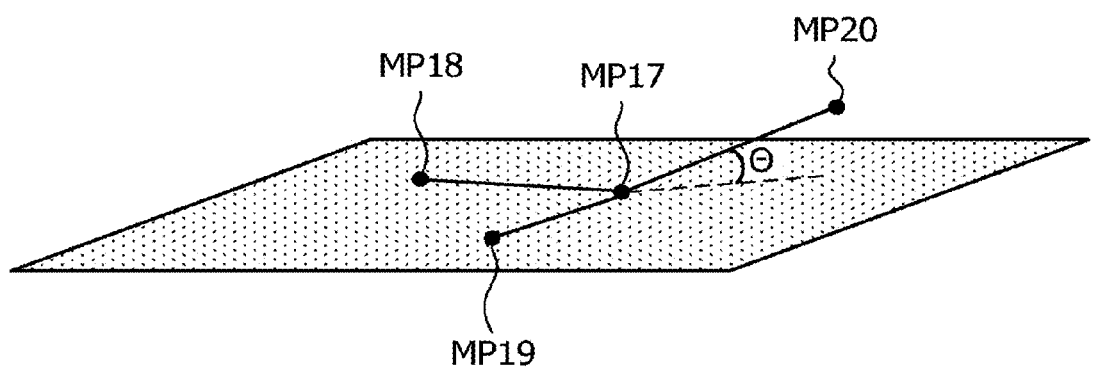
FIG. 13 is a diagram describing an example of a method of calculating priorities according to the second embodiment.

Referring to FIG. 13, it is assumed that the priority calculating unit 47 selects a combination of map points (characteristic points) MP18 to MP20 separated by the predetermined distance or less from a target physical corner point MP17. The map point (characteristic point) MP20 is not distributed on a plane on which the target physical corner point MP17 and the map points (characteristic points) MP18 and MP19 are distributed, as illustrated in FIG. 13. In this case, the priority calculating unit 47 calculates an angle θ formed between the plane on which the target physical corner point MP17 and the map points (characteristic points) MP18 and MP19 are distributed and a line connecting the target physical corner point MP17 to the map point (characteristic point) MP20. FIG. 13 is a diagram describing an example of a method of calculating priorities according to the second embodiment.

Figure 14:
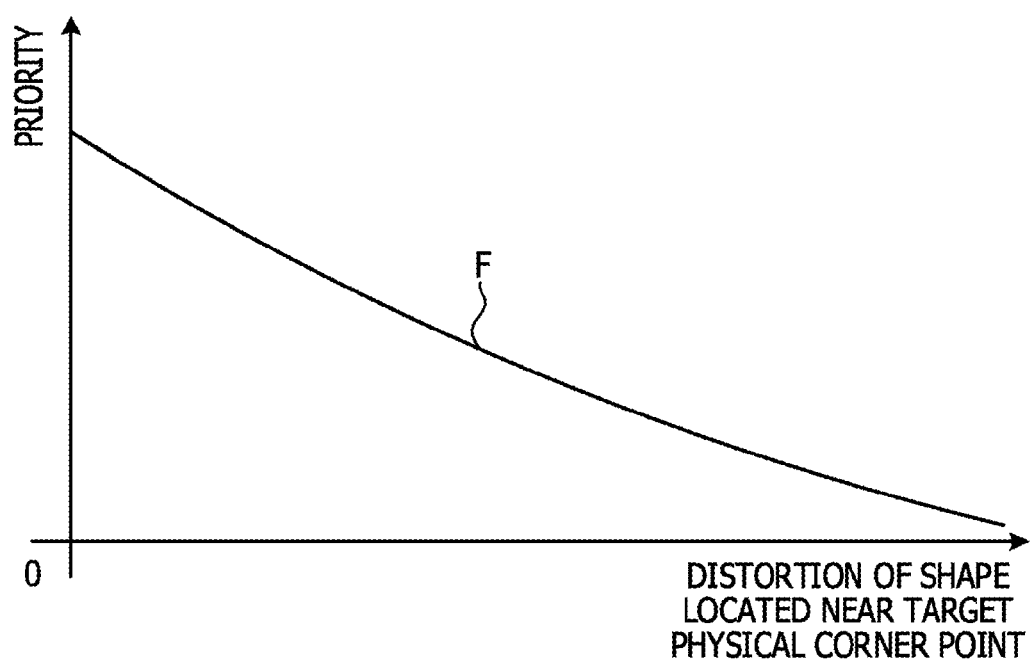
FIG. 14 is a graph illustrating an example of a function for calculating priorities according to the second embodiment.

For example, as illustrated in FIG. 14, the priority calculating unit 47 calculates a priority based on a calculated average angle (distortion of a shape located near a target physical corner point) in accordance with a function F that is defined to ensure that the smaller a distortion (warpage) of a shape located near a target physical corner point, the higher a priority of the target physical corner point. Specifically, as the shape located near the physical corner point is closer to the plane, the priority of the physical corner point that is calculated by the priority calculating unit 47 is higher. FIG. 14 is a graph illustrating an example of the function F to be used to calculate priorities according to the second embodiment.

The distortion of the shape located near the physical corner point may be calculated by approximating, to a plane, the target physical corner point and the map points (characteristic points) separated by the predetermined distance or less from the target physical corner point and calculating the average of deviations from the approximated plane, the sum of the deviations, the sum of the squares of the deviations, or the like.

If the approximated plane is $aX+bY+cZ=d$, the sum D (distortion of the shape located near the target physical corner point) of the squares of the deviations from the approximated plane of the target physical corner point and the map points (characteristic points) separated by the predetermined distance or less from the target physical corner point may be calculated according to the following Equation 2.

$$D=\Sigma|d-aX-bY-cZ|^2 \quad \text{(Equation 2)}$$

Return to FIG. 10. The map point information setting unit 42 sets the map point information storage unit 21. Specifically, for example, the map point information setting unit 42 uses the stereo matching method such as the sequential similarity detection algorithm or the area correlation method to execute the matching of characteristic points detected by the characteristic point detecting unit 41 and located on two acquired images. Then, the map point information setting unit 42 calculates three-dimensional coordinates of successfully matched characteristic points by the stereo process.

Then, the map point information setting unit 42 detects, for each of the successfully matched characteristic points, positional relationships between the successfully matched characteristic point and characteristic points located adjacent to the successfully matched characteristic point (target characteristic point). In this case, the map point information setting unit 42 selects, for each of the successfully matched characteristic points, a predetermined number (for example, three or more) of characteristic points located near the successfully matched characteristic point in ascending order of distance between the successfully matched characteristic point and characteristic points located adjacent to the successfully matched characteristic point, for example. Then, the map point information setting unit 42 identifies the types of the successfully matched characteristic points. Specifically, if the target physical corner point and the selected characteristic points located adjacent to the target physical corner points are distributed on the same plane, the map point information setting unit 42 identifies that the type of the target physical corner point is a "planar pattern point". On the other hand, if the target physical corner point and the selected characteristic points located adjacent to the target physical corner point are not distributed on the same plane, the map point information setting unit 42 identifies that the type of the target physical corner point is a "physical corner point".

In addition, the map point information setting unit 42 calculates characteristic amounts of the successfully matched characteristic points and generates image pattern templates for the successfully matched characteristic points. Then, the map point information setting unit 42 associates map point information including priorities calculated by the priority calculating unit 47 with the identifiers of map points whose types are physical corner points and causes the map point information and the map point identifiers to be stored in the map point information storage unit 21.

The matching requirement setting unit 43 references the matching requirement storage unit 22 and sets a matching requirement such as a requirement to select map points to be subjected to the matching with characteristic points (detected points) detected by the character point detecting unit 41 and located on an acquired image. Specifically, the matching requirement setting unit 43 references the matching requirement storage unit 22, identifies the matching requirement based on a setting number associated with the matching requirement, and sets the identified matching requirement. In the second embodiment, the matching requirement setting unit 43 sets, as an initial matching requirement, a requirement to select map points whose types are "planar pattern points" and that are to be subjected to the matching.

Then, if the number of successfully matched pairs of characteristic points (detected points) and map points is smaller than the predetermined threshold Z as a result of the matching executed by the matching processing unit 44, the matching requirement setting unit 43 references the matching requirement storage unit 22 and sets another matching requirement so as to relax the matching requirement. The matching requirement setting unit 43 repeats this process until the number of successfully matched pairs becomes equal to or larger than the predetermined threshold Z or until an unselected physical corner point does not exist.

The predetermined threshold Z is a value that is obtained by experimentally calculating the number of pairs of map points and characteristic points (detected points) and enables the removal of a variation in the accuracy of the estimation of the position and orientation of the camera.

If the matching requirement set by the matching requirement setting unit 43 is a requirement to select map points, the matching processing unit 44 selects the map points in accordance with the selection requirement. Then, the matching processing unit 44 executes the matching of the characteristic points (detected points) detected by the characteristic point detecting unit 41 and located on the acquired image with the selected map points again. If the matching requirement is changed and the change causes a change in the requirement to select map points, the matching processing unit 44 selects map points in accordance with the matching requirement after the change and executes the matching of the selected map points with the characteristic points (detected points) located on the acquired image in accordance with the matching requirement after the change.

On the other hand, if the matching requirement after the change does not cause a change in the requirement to select map points, the matching processing unit 44 executes the matching of the characteristic points (detected points) with previously selected map points. As the matching requirement that does not cause a change in the requirement to select map points, there is the matching requirement that reduces the threshold for similarities between characteristic points (detected points) and map points, or the like, for example. The threshold is used to determine whether or not the characteristic points (detected points) successfully match the map points in the matching process.

Figure 15:
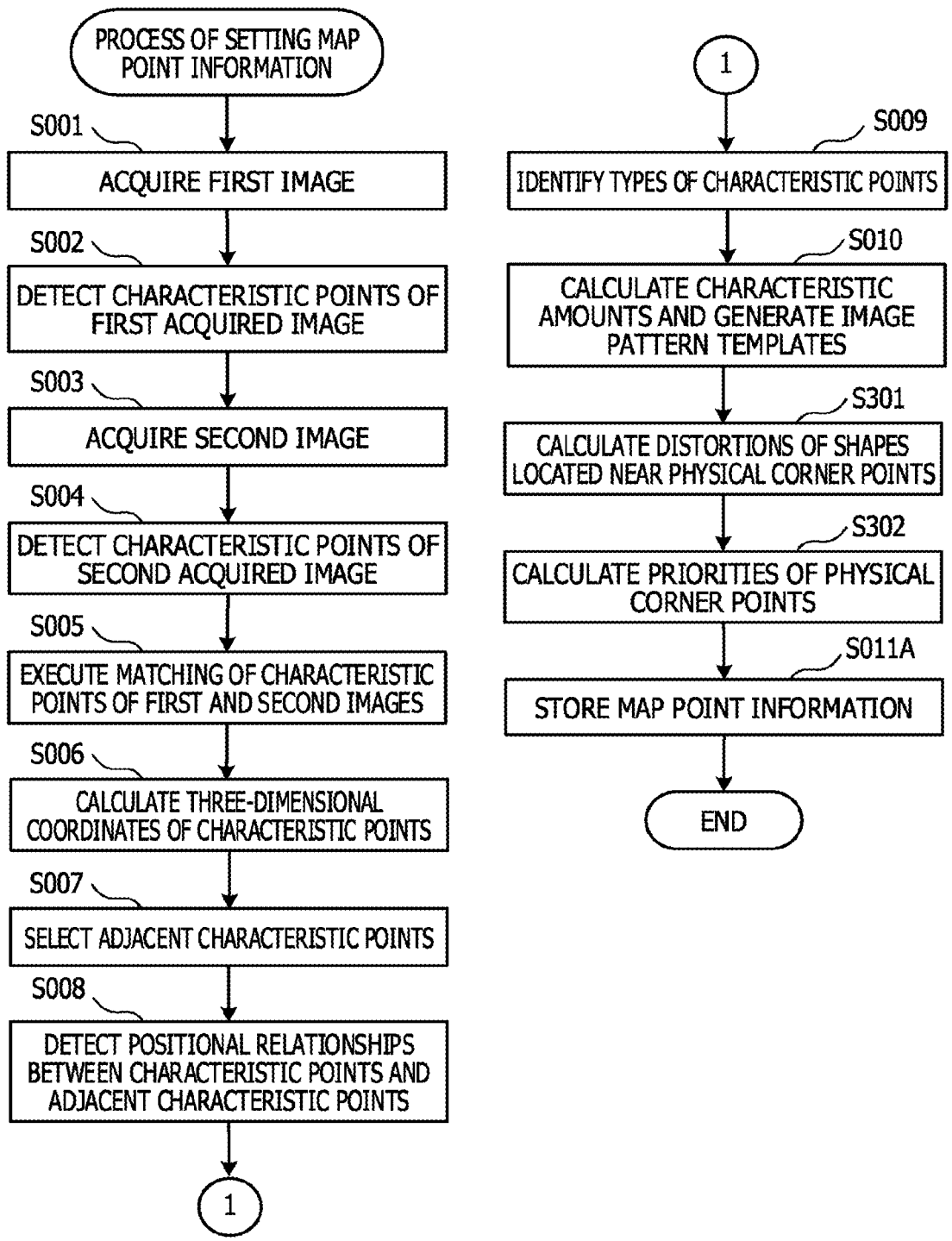
FIG. 15 is an example of a flowchart describing a process of setting map point information according to the second embodiment.

Next, the flow of a process of setting map point information according to the second embodiment is described with reference to FIG. 15. FIG. 15 is an example of a flowchart of the process of setting map point information according to the second embodiment. The process of setting map point information is started by a predetermined operation performed by the user through the operating unit (not illustrated) as a trigger, for example. The process of setting map point information may be repeatedly executed at predetermined time intervals or every time when an image is acquired.

The image acquiring unit 10 acquires a first image and outputs the first acquired image to the controlling unit 40 (in step S001). The characteristic point detecting unit 41 detects characteristic points of the first input acquired image (in step S002).

Then, the image acquiring unit 10 acquires a second image and outputs the second acquired image to the controlling unit 40 (in step S003). The characteristic point detecting unit 41 detects characteristic points of the second input acquired image (in step S004).

Then, the map point information setting unit 42 executes the stereo matching on the characteristic points of the first and second acquired images (in step S005) and calculates three-dimensional coordinates of successfully matched characteristic points (in step S006). Then, the map point information setting unit 42 selects a predetermined number of characteristic points located adjacent to each of the successfully matched characteristic points (in step S007) and detects positional relationships between each of the successfully matched characteristic points and characteristic points located adjacent to each of the successfully matched characteristic points (in step S008).

Then, the map point information setting unit 42 identifies the types of the successfully matched characteristic points (in step S009). Then, the map point information setting unit 42 calculates characteristic amounts of the successfully matched characteristic points and generates image pattern templates for the successfully matched characteristic points (in step S010).

Then, the priority calculating unit 47 calculates distortions of shapes located near map points (characteristic points) whose types are physical corner points (in step S301) and calculates, based on the calculated distortions of the shapes, priorities of the map points (characteristic points) whose types are the physical corner points (in step S302).

Then, the map point information setting unit 42 associates map point information including the priorities calculated by the priority calculating unit 47 with the identifiers of the map points whose types are the physical corner points and causes the map point information and the map point identifiers to be stored in the map point information storage unit 21 (in step S011A). Then, the process is terminated.

Figure 16:
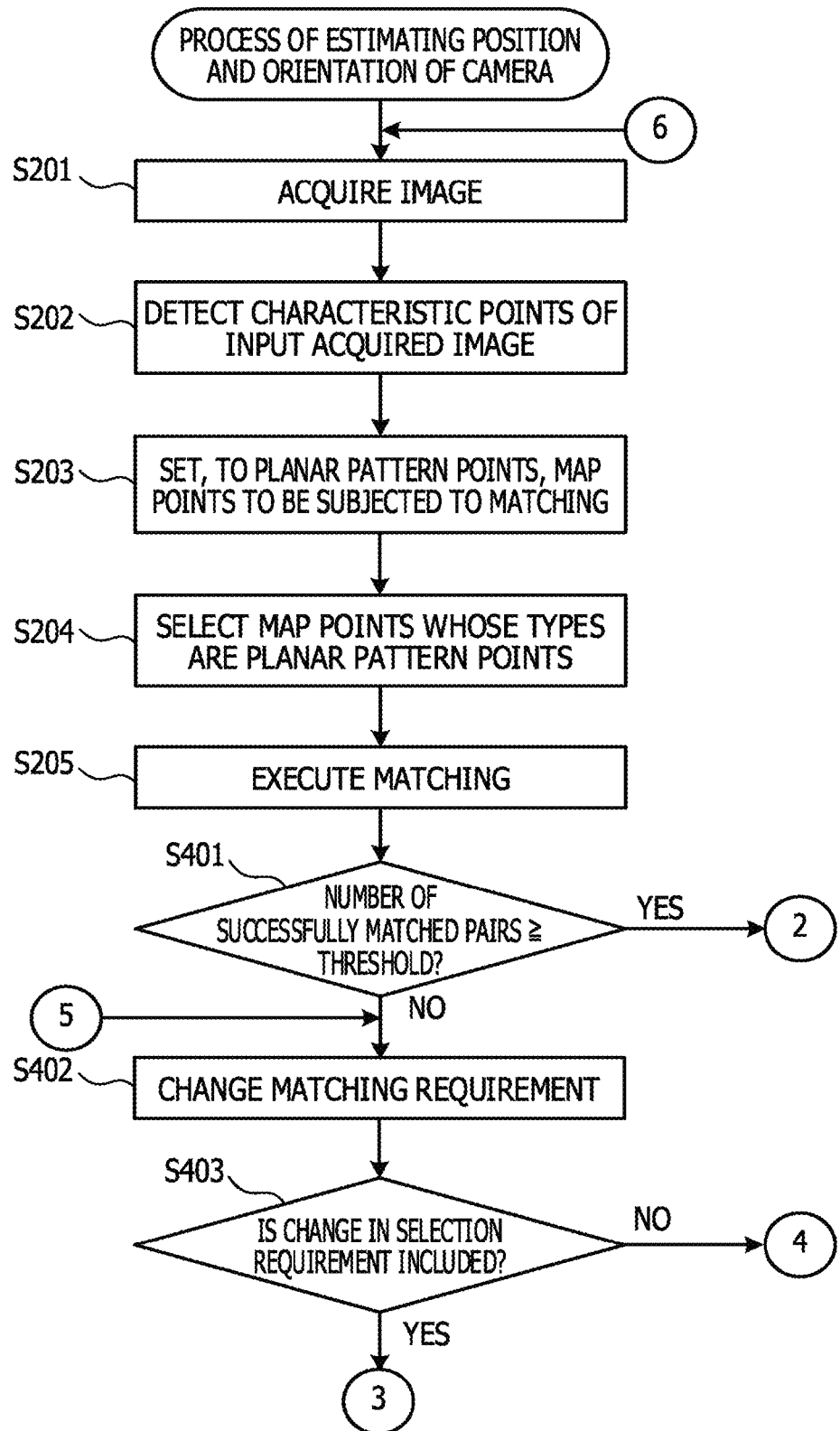
FIG. 16 is a part of an example of a flowchart describing a process of estimating the position and orientation of the camera according to the second embodiment.
Figure 17:
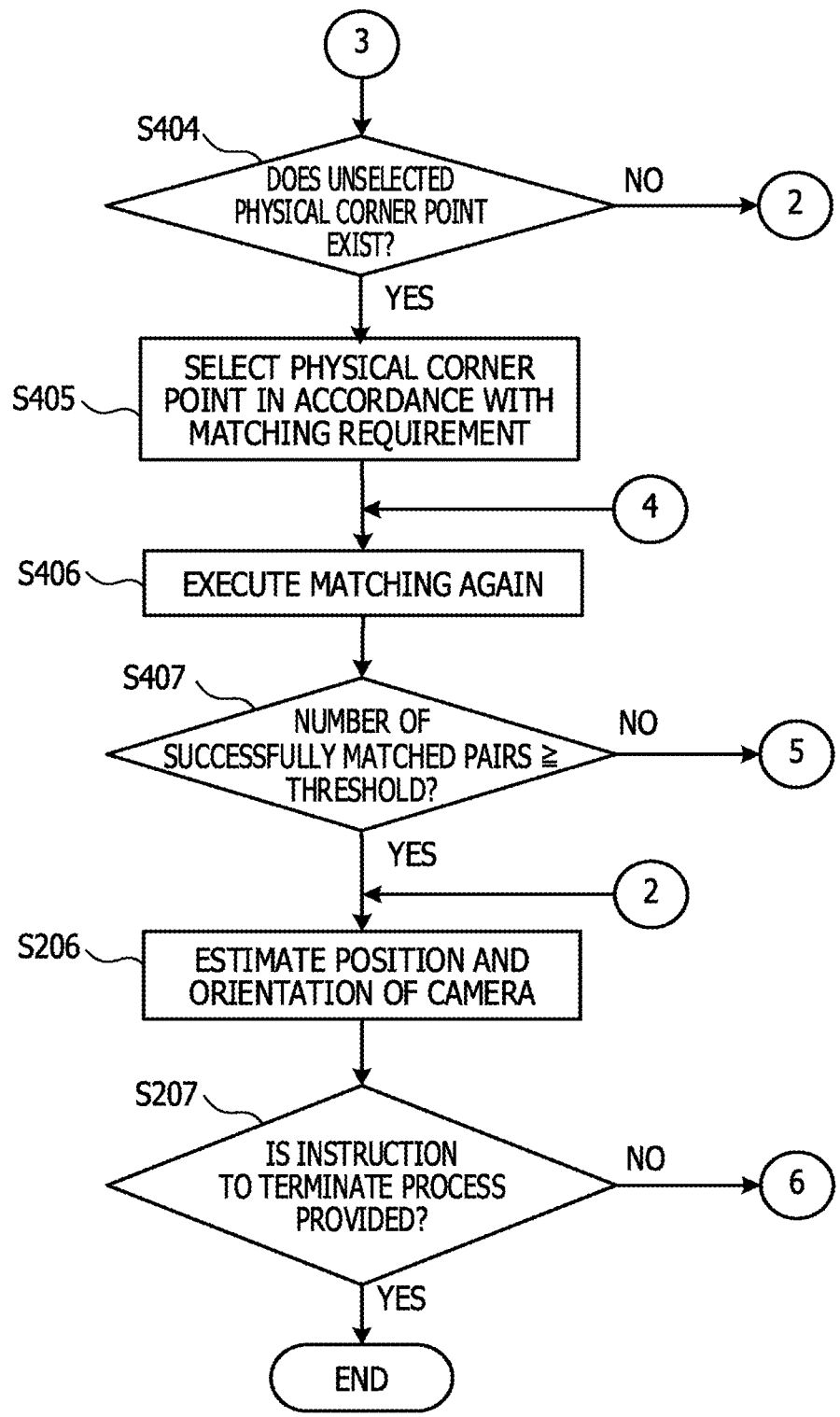
FIG. 17 is the other part of the example of the flowchart describing the process of estimating the position and orientation of the camera according to the second embodiment.

Next, the flow of a process of estimating the position and orientation of the camera according to the second embodiment is described with reference to FIGS. 16 and 17. FIG. 16 is a part of an example of a flowchart of the process of estimating the position and orientation of the camera according to the second embodiment, while FIG. 17 is the other part of the example of the flowchart of the process of estimating the position and orientation of the camera according to the second embodiment. The process of estimating the position and orientation of the camera is started when the process of setting map point information is executed and the map point information is stored in the map point information storage unit 21 as a trigger, for example.

The image acquiring unit 10 acquires an image and outputs the acquired image to the controlling unit 40 (in step S201). Then, the characteristic point detecting unit 41 detects characteristic points of the input acquired image (in step S202). Then, the matching requirement setting unit 43 sets a matching requirement to select map points whose types are planar pattern points (in step S203).

The matching processing unit 44 selects the map points whose types are the planar pattern points (in step S204) and executes the matching of the detected characteristic points (detected points) with the selected map points (in step S205). Then, the matching requirement setting unit 43 determines whether or not the number of successfully matched pairs of characteristic points (detected points) and map points is equal to or larger than the predetermined threshold Z (in step S401).

If the matching requirement setting unit 43 determines that the number of the successfully matched pairs is equal to or larger than the predetermined threshold Z (YES in step S401), the process proceeds to the process of step S206. On the other hand, if the matching requirement setting unit 43 determines that the number of the successfully matched pairs is smaller than the predetermined threshold Z (NO in step S401), the matching requirement setting unit 43 references the matching requirement storage unit 22 and changes (relaxes) the matching requirement (in step S402).

Then, the matching processing unit 44 determines whether or not the matching requirement after the change includes a change in a requirement to select map points (in step S403). If the matching processing unit 44 determines that the matching requirement after the change includes the change in the requirement to select map points (YES in step S403), the matching processing unit 44 determines whether or not an unselected physical corner point exists (in step S404).

If the matching processing unit 44 determines that the unselected physical corner point exists (YES in step S404), the matching processing unit 44 selects the physical corner point in accordance with the matching requirement after the change (in step S405). Then, the matching processing unit 44 executes the matching of the selected physical corner point with the characteristic points (detected points) again in accordance with the matching requirement after the change (in step S406). Then, the process proceeds to a process of step S407 described later. On the other hand, if the matching processing unit 44 determines that the unselected physical corner point does not exist (NO in step S404), the process proceeds to the process of step S206.

If the matching processing unit 44 determines that the matching requirement after the change does not include the change in the requirement to select map points (NO in step S403), the matching processing unit 44 executes the matching of a previously selected physical corner point with the characteristic points (detected points) again in accordance with the matching requirement after the change (in step S406).

Then, the matching requirement setting unit 43 determines again whether or not the number of successfully matched pairs of characteristic points (detected points) and map points is equal to or larger than the predetermined threshold Z (in step S407). If the matching requirement setting unit 43 determines that the number of the successfully matched pairs is smaller than the predetermined threshold Z (NO in step S407), the process returns to the process of S402, and the aforementioned processes are repeated.

On the other hand, if the matching requirement setting unit 43 determines that the number of the successfully matched pairs is equal to or larger than the predetermined threshold Z (YES in step S407), the estimating unit 45 estimates the position and orientation of the camera based on the successfully matched pairs of map points and characteristic points (detected points) (in step S206).

Then, the controlling unit 40 determines whether or not an instruction to terminate the process is provided (in step S207). The controlling unit 40 determines whether or not a predetermined operation (for example, the termination of the application) is performed by the user through the operating unit (not illustrated), and thereby determines whether or not the instruction to terminate the process is provided. If the controlling unit 40 determines that the instruction to terminate the process is not provided (NO in step S207), the process returns to the process of step S201, and the aforementioned processes are repeated. On the other hand, if the controlling unit 40 determines that the instruction to terminate the process is provided (YES in step S207), the process is terminated.

According to the second embodiment, the communication device 1 identifies the types of map points to be subjected to the matching with characteristic points (detected points) on an acquired image, compares rates of causing planar pattern points to contribute to the estimation of the position and orientation of the camera with rates of causing physical corner points to contribute to the estimation of the position and orientation of the camera, and reduces the rates of causing the physical corner points to contribute to the estimation of the position and orientation of the camera. Thus, an effect of erroneous matching may be reduced and the accuracy of estimating the position and orientation of the camera may be improved.

In addition, according to the second embodiment, the communication device 1 identifies the types of map points to be subjected to the matching with characteristic points (detected points) on an acquired image and initially selects map points whose types are planar pattern points and that are to be subjected to the matching. Thus, the communication device 1 compares rates of causing the planar pattern points to contribute to the estimation of the position and orientation of the camera with rates of causing physical corner points to contribute to the estimation of the position and orientation of the camera and reduces the rates of causing the physical corner points to contribute to the estimation of the position and orientation of the camera. Thus, an effect of erroneous matching may be reduced and the accuracy of estimating the position and orientation of the camera may be improved.

In addition, according to the second embodiment, if the number of successfully matched pairs of characteristic points (detected points) and map points is smaller than the predetermined threshold Z in the matching of only planar pattern points, the communication device 1 changes (relaxes) a matching requirement and executes the matching of characteristic points (detected points) with map points in accordance with the matching requirement after the change. Thus, the number of successfully matched pairs may increase, a variation in the accuracy of estimating the position and orientation of the camera may be removed, and the accuracy of estimating the position and orientation of the camera may be improved.

In addition, according to the second embodiment, if the number of successfully matched pairs of characteristic points (detected points) and map points is smaller than the predetermined threshold Z, the communication device 1 relaxes the matching requirement until the number of successfully matched pairs reaches the predetermined threshold Z, and the communication device 1 repeats the matching of characteristic points (detected points) and map points. Thus, the number of pairs that enable the removal of a variation in the accuracy of estimating the position and orientation of the camera may be maintained and the accuracy of estimating the position and orientation of the camera may be improved.

In addition, according to the second embodiment, if the number of successfully matched pairs of characteristic points (detected points) and map points is smaller than the predetermined threshold Z, the communication device 1 arbitrarily selects a physical corner point and executes the matching of the characteristic points (detected points) and the selected physical corner point again. Thus, the number of successfully matched pairs may increase, a variation in the accuracy of estimating the position and orientation of the camera may be removed, and the accuracy of estimating the position and orientation of the camera may be improved.

In addition, according to the second embodiment, the communication device 1 calculates priorities for physical corner points. If the number of successfully matched pairs of characteristic points (detected points) and map points is smaller than the predetermined threshold Z, the communication device 1 selects a physical corner point based on the priorities. Then, the communication device 1 executes the matching of the characteristic points (detected points) and the selected physical corner point again. The smaller a distortion of a shape located near the physical corner point, the higher the priority of the physical corner point. Thus, a physical corner point that is less likely to cause erroneous matching may be subjected to the matching on a priority basis, and erroneous matching may be suppressed. Thus, the accuracy of estimating the position and orientation of the camera may be improved.

Third Embodiment

In a third embodiment, if physical corner points are subjected to the matching, an effect of erroneous matching is reduced by reducing rates of causing the physical corner points to contribute to the estimation of the position and orientation of the camera. Thus, the accuracy of estimating the position and orientation of the camera is improved. A configuration described in the third embodiment is applicable to both first embodiment and second embodiment. An example in which the configuration described in the third embodiment is applied to the first embodiment is described below.

Figure 18:
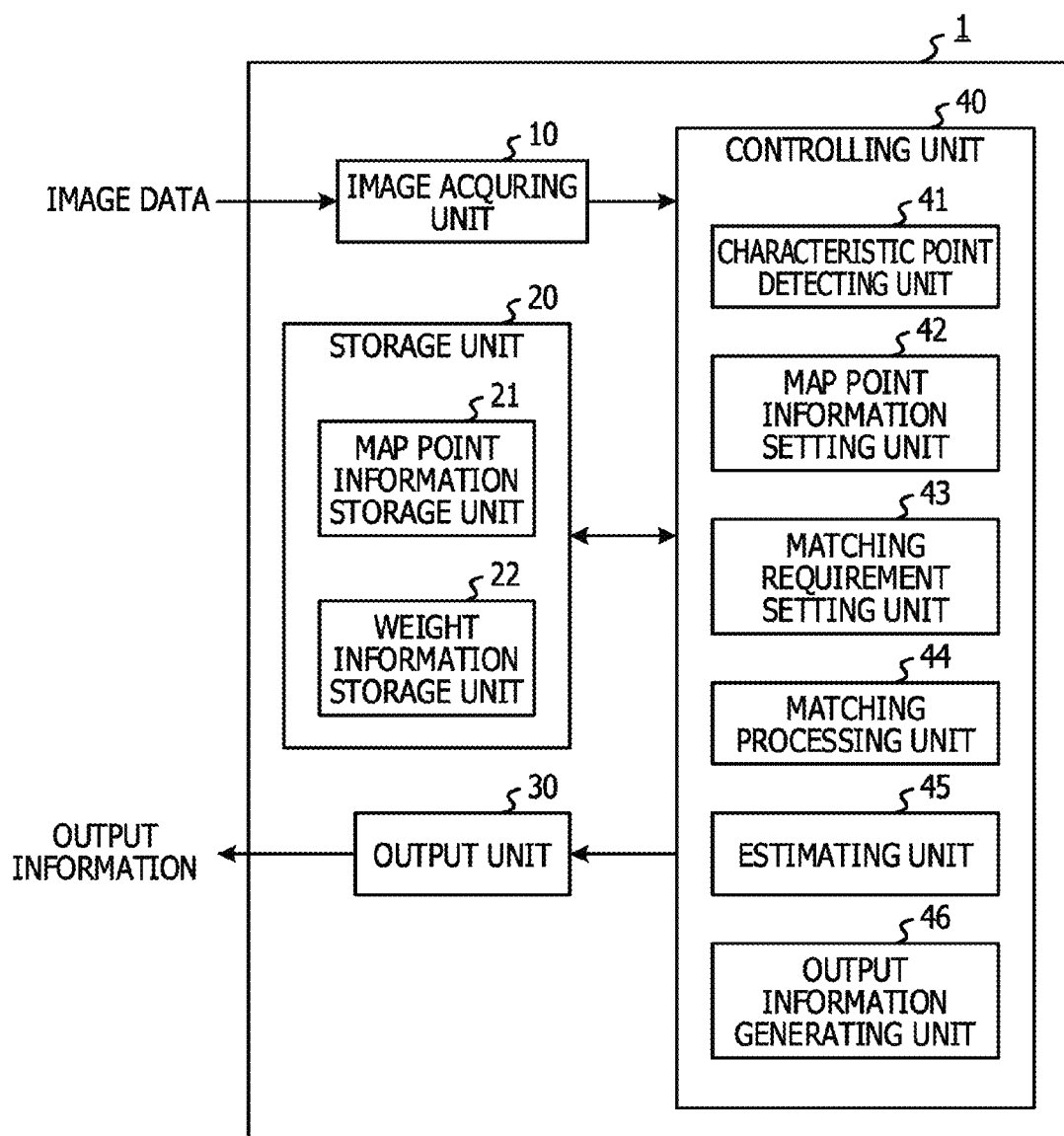
FIG. 18 is a functional block diagram illustrating an example of a configuration of a communication device according to a third embodiment.

FIG. 18 is a functional block diagram illustrating an example of a configuration of a communication device 1 according to the third embodiment. A basic configuration of the communication device 1 according to the third embodiment is the same as the basic configuration described in the first embodiment. As illustrated in FIG. 18, however, the third embodiment is different from the first embodiment in that the storage unit 20 further functions as a weight information storage unit 23. In addition, functions of the matching requirement setting unit 43, matching processing unit 44, and estimating unit 45 are slightly different from those described in the first embodiment.

FIG. 19 is a diagram illustrating an example of a configuration of the weight information storage unit 23 according to the third embodiment. The weight information storage unit 23 according to the third embodiment stores "types" and "weights" associated with the "types".

The "weights" are weights to be added to deviations (for example, the squares of the deviations) of successfully matched characteristic points (detected points) from points obtained by projecting corresponding map points upon the estimation of the position and orientation of the camera. In the third embodiment, a weight W1 for planar pattern points is larger than a weight W2 for physical corner points. For example, the weight W1 is 1, while the weight W2 for physical corner points is 0.6. Specifically, in the third embodiment, the same weight W2 is applied to all physical corner points.

The matching requirement setting unit 43 sets a matching requirement such as a requirement to select map points to be subjected to the matching with characteristic points (detected points) detected by the character point detecting unit 41 and located on an acquired image. In the third embodiment, the matching requirement setting unit 43 sets, as the matching requirement, a requirement to select all map points to be subjected to the matching.

The matching processing unit 44 selects the map points in accordance with the matching requirement set by the matching requirement setting unit 43 and executes the matching of the characteristic points (detected points) detected by the characteristic point detecting unit 41 and located on the acquired image with the selected map points.

In the third embodiment, since the matching requirement setting unit 43 sets, as the matching requirement, the requirement to select all the map points to be subjected to the matching, the matching processing unit 44 selects all the map points stored in the map point information storage unit 21 and executes the matching of the selected points with the characteristic points (detected points).

The estimating unit 45 estimates the position and orientation of the camera based on successfully matched pairs of characteristic points (detected points) subjected to the matching by the matching processing unit 44 and map points subjected to the matching by the matching processing unit 44. In this case, the estimating unit 45 compares rates of causing planar pattern points to contribute to the estimation of the position and orientation of the camera with rates of causing physical corner points to contribute to the estimation of the position and orientation of the camera and reduces the rates of causing the physical corner points to contribute to the estimation of the position and orientation of the camera. Thus, even if the physical corner points are to be subjected to the matching, an effect of erroneous matching may be reduced and the accuracy of estimating the position and orientation of the camera may be improved.

For example, the estimating unit 45 estimates the position and orientation of the camera in accordance with the conventional technique by calculating the camera orientation matrix M that minimizes the sum E' of squares Wpi|Xpi−Xp'i|², weighted by adding a weight Wpi for the map points to the squares of deviations of the characteristic points (detected points) from points obtained by projecting the corresponding map points, of the deviations. The estimating unit 45 references the weight information storage unit 23 and identifies the weight Wpi for the map points based on the types of the map points.

The sum E' of the squares of the deviations of the successfully matched characteristic points (detected points) from the points obtained by projecting the corresponding map points may be expressed according to the following Equation 3.

$$E' = \Sigma Wpi |Xpi - Xp'i|^2 \quad \text{(Equation 3)}$$

If the configuration described in the third embodiment is applied to the second embodiment, and the map points are physical corner points, the weight Wpi to be added may be variable based on set priorities. In this case, the weight Wpi to be added is set so as to ensure that the smaller a priority, the smaller the weight Wpi to be added. Thus, the weight Wpi to be added may be set so as to ensure that the larger a distortion (warpage) of a shape located near a physical corner point that is likely to cause erroneous matching, the smaller the weight Wpi to be added. Thus, an effect of erroneous matching may be reduced.

Figure 20:
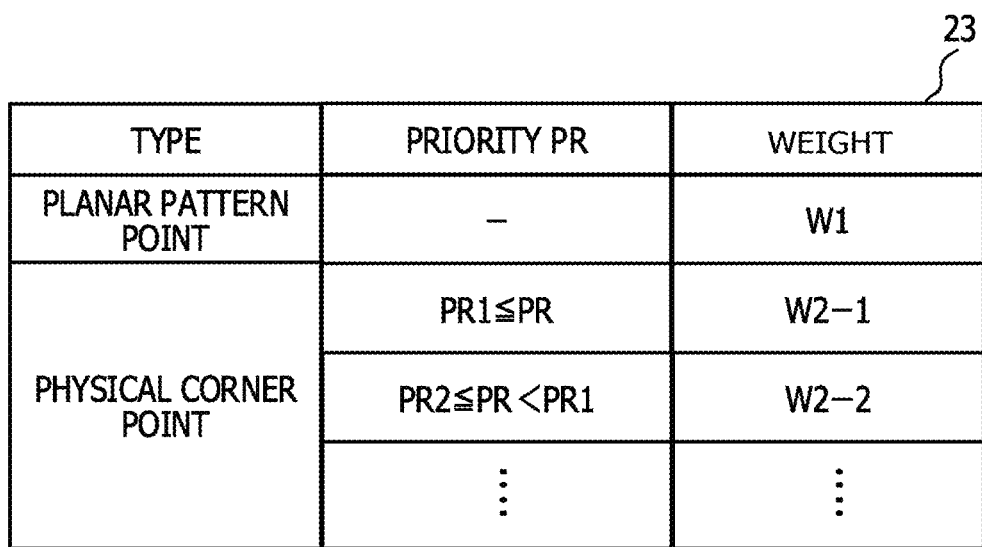
FIG. 20 is a diagram illustrating another example of the configuration of the weight information storage unit according to the third embodiment.

In the aforementioned case, the weight information storage unit 23 may be configured as illustrated in FIG. 20, for example. Specifically, it is sufficient if the weights are associated based on the priorities. FIG. 20 is a diagram illustrating another example of the configuration of the weight information storage unit 23.

The aforementioned method is an example of a method of comparing rates of causing planar pattern points to contribute to the estimation of the position and orientation of the camera with rates of causing physical corner points to contribute to the estimation of the position and orientation of the camera and reducing the rates of causing the physical corner points to contribute to the estimation of the position and orientation of the camera. For example, the matching may be executed on all physical corner points, and the estimating unit 45 may remove (exclude) physical corner points so as to reduce the ratio of the number of successfully matched physical corner points to all the physical corner points to a predetermined value (for example, 10%) or less and thereby reduce the rates of causing the physical corner points to contribute to the estimation of the position and orientation of the camera.

According to the third embodiment, the communication device 1 estimates the position and orientation of the camera while excluding successfully matched pairs of characteristic points (detected points) and map points whose types are physical corner points so as to ensure that the ratio of the number of successfully matched pairs of characteristic points (detected points) and map points whose types are physical corner points to the number of successfully matched pairs of characteristic points (detected points) and map points is equal to or smaller than a predetermined value. Thus, rates of causing physical corner points to contribute to the estimation of the position and orientation of the camera may be reduced. Thus, an effect of erroneous matching may be reduced and the accuracy of estimating the position and orientation of the camera may be improved.

In addition, according to the third embodiment, the communication device 1 adds the weights associated with the types of map points to deviations of successfully matched characteristic points (detected points) from points obtained by projecting successfully matched map points and estimates the position and orientation of the camera based on the deviations. The weight to be added to deviations corresponding to physical corner points is smaller than the weight to be added to deviations corresponding to planar pattern points. Thus, the rates of causing the physical corner points to contribute to the estimation of the position and orientation of the camera may be reduced. Thus, an effect of erroneous matching may be reduced and the accuracy of estimating the position and orientation of the camera may be improved.

In addition, according to the third embodiment, the weight to be added to deviations corresponding to physical corner points may be variable based on priorities set for the physical corner points. Specifically, the smaller a priority of a physical corner point, the smaller the weight to be added to an deviation corresponding to the physical corner point. Thus, as the possibility that a physical corner point causes erroneous matching increases, a rate of causing the physical corner point to contribute to the estimation of the position and orientation of the camera may be reduced.

Fourth Embodiment

The first embodiment describes the example in which the stereo matching method is used for the calculation of three-dimensional coordinates of map points.

A fourth embodiment describes a process of setting map point information in a case where three-dimensional coordinates of map points are acquired using a three-dimensional distance sensor (3D distance sensor) (not illustrated). If the 3D distance sensor is used, three-dimensional coordinates of pixels on an acquired image may be acquired in real time by the correction of a positional relationship with the camera. A configuration described in the fourth embodiment is applicable to the aforementioned embodiments. An example in which the configuration described in the fourth embodiment is applied to the second embodiment is described below.

Figure 21:
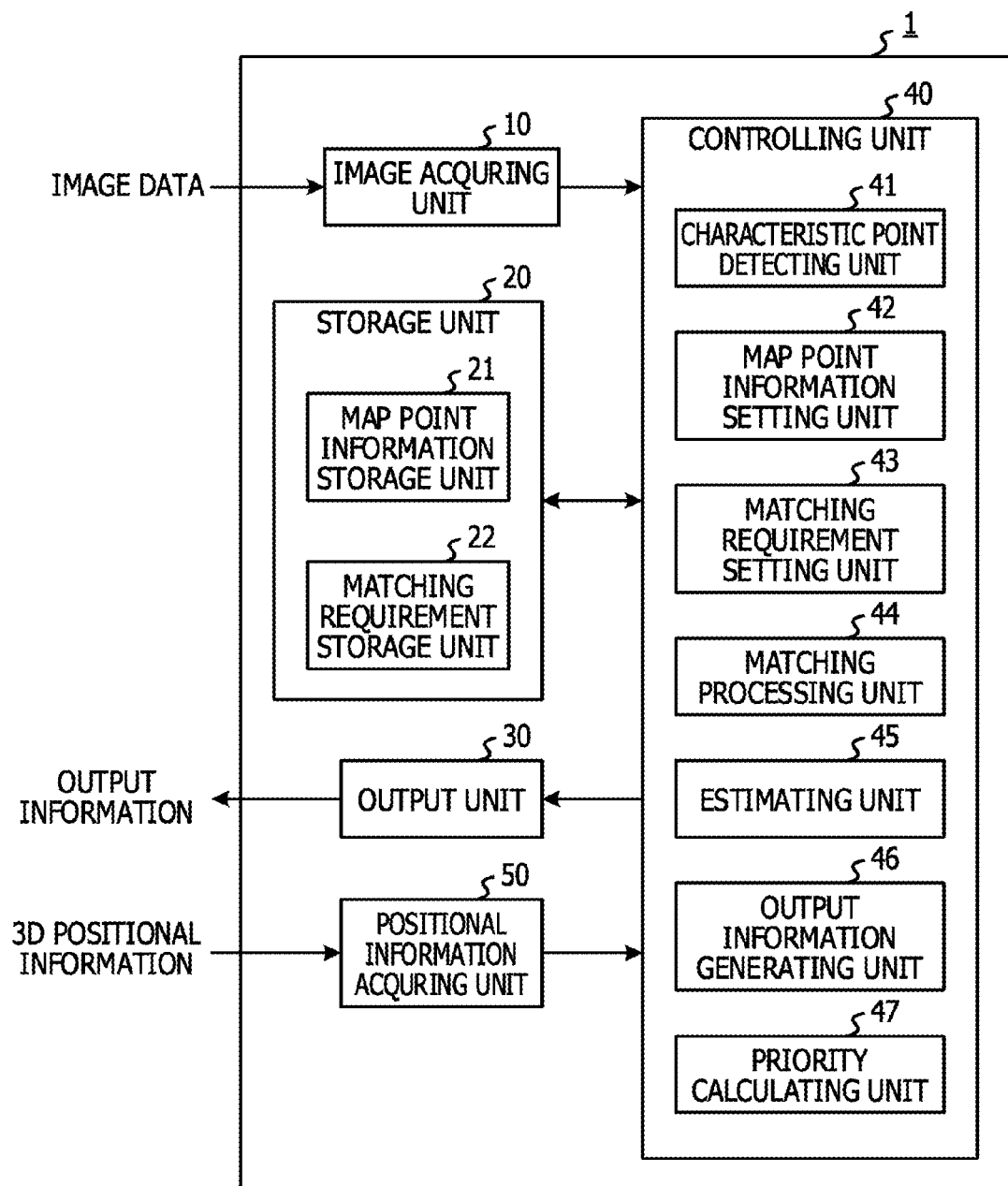
FIG. 21 is a functional block diagram illustrating an example of a configuration of a communication device according to a fourth embodiment.

FIG. 21 is a functional block diagram illustrating an example of a configuration of a communication device 1 according to the fourth embodiment. A basic configuration of the communication device 1 according to the fourth embodiment is the same as the basic configuration described in the second embodiment. As illustrated in FIG. 21, however, the fourth embodiment is different from the second embodiment in that the communication device 1 further includes a positional information acquiring unit 50. In addition, functions of the map point information setting unit 42 and priority calculating unit 47 are slightly different from those described in the second embodiment.

The positional information acquiring unit 50 includes a device interface, a communication module, or the like, for example. The positional information acquiring unit 50 acquires, from the connected 3D distance sensor, information (hereinafter referred to as three-dimensional positional information (3D positional information)) indicating three-dimensional coordinates of points of an object to be imaged. Then, the positional information acquiring unit 50 outputs the acquired 3D positional information to the controlling unit 40.

The map point information setting unit 42 sets the map point information storage unit 21. Specifically, the map point information setting unit 42 according to the fourth embodiment identifies, based on the input 3D positional information, three-dimensional coordinates of characteristic points detected by the characteristic point detecting unit 41.

Then, the map point information setting unit 42 detects positional relationships between the detected characteristic points (target characteristic points) and characteristic points located adjacent to the target characteristic points. In this case, the map point information setting unit 42 selects a predetermined number of characteristic points located adjacent to each of the target characteristic points in ascending order of distance, for example. Specifically, if a target characteristic point and selected characteristic points located adjacent to the target characteristic point are distributed on the same plane, the map point information setting unit 42 identifies that the type of the target characteristic point is a "planar pattern point". On the other hand, if the target characteristic point and the selected characteristic points located adjacent to the target characteristic point are not distributed on the same plane, the map point information setting unit 42 identifies that the type of the target characteristic point is a "physical corner point".

In addition, the map point information setting unit 42 calculates characteristic amounts of the detected characteristic points and generates image pattern templates for the detected characteristic points. Then, the map point information setting unit 42 associates map point information including priorities calculated by the priority calculating unit 47 with the identifiers of map points whose types are physical corner points and causes the map point information and the map point identifiers to be stored in the map point information storage unit 21.

By using the 3D positional information acquired from the 3D distance sensor, the map point information setting unit 42 may arbitrarily select a predetermined number (for example, three or more) of pixels separated by a predetermined distance or less from each of target characteristic points and identify the types of the detected characteristic points based on positional relationships between the selected pixels and the target characteristic points.

Figure 22:
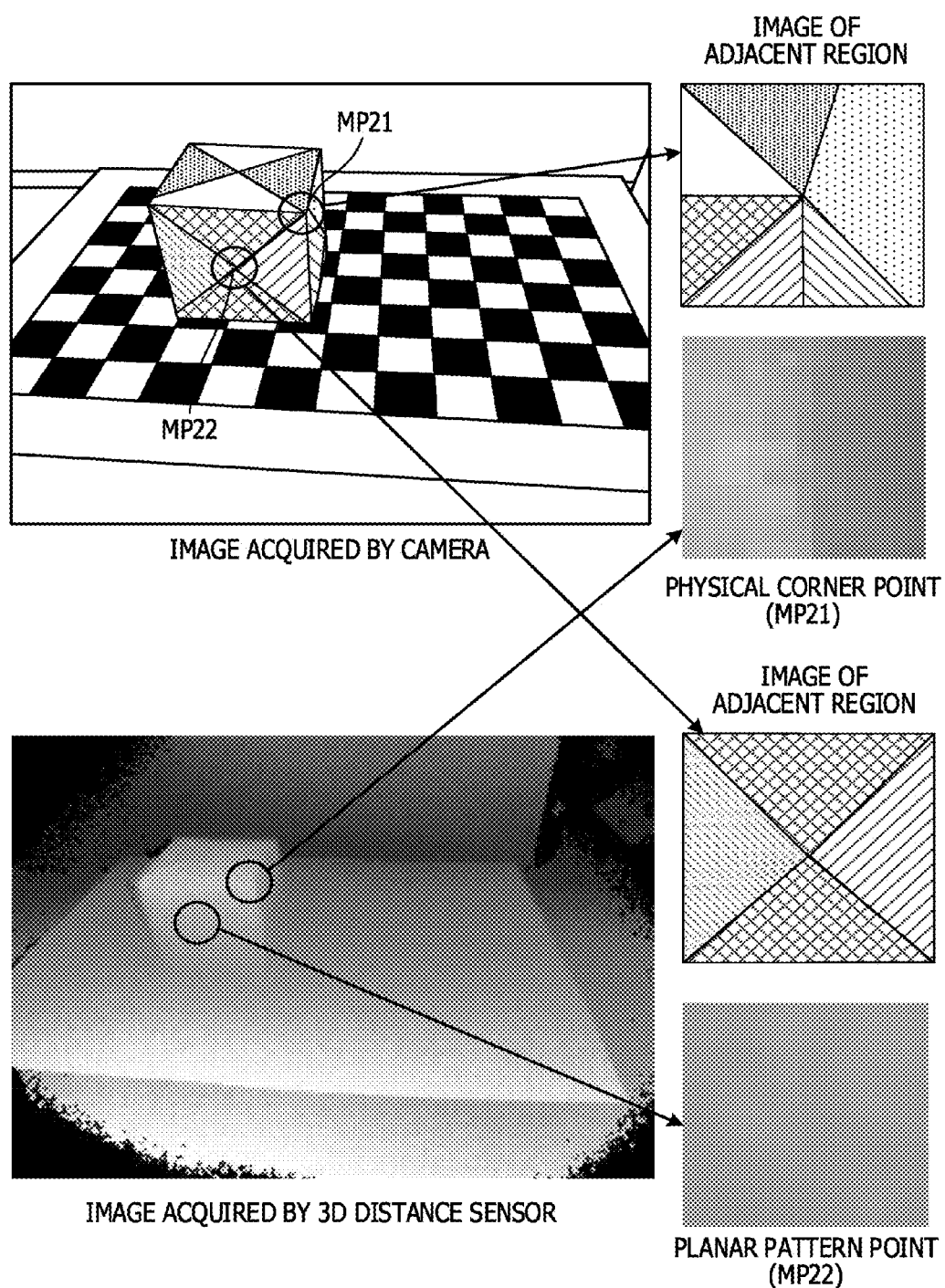
FIG. 22 is a diagram describing an example of a method of identifying the types according to the fourth embodiment.

A method of identifying the types of the characteristic points based on the positional relationships between the selected pixels and the target characteristic points is described with reference to FIG. 22. FIG. 22 is a diagram describing an example of the method of identifying the types according to the fourth embodiment.

An image acquired from the 3D distance sensor is an image in which the brightness (luminance) of pixels varies based on distances from the 3D distance sensor. Specifically, the image acquired from the 3D distance sensor is the image in which the farther from the 3D distance sensor a part corresponding to a pixel, the darker the brightness of the pixel (or the lower the luminance of the pixel). It is apparent that, in an image of a region located near a characteristic point MP21 on the image acquired from the 3D distance sensor, a light pixel region and a dark pixel region exist.

On the other hand, it is apparent that, in an image of a region located near a characteristic point MP22 on the image acquired from the 3D distance sensor, the brightness (luminance) of pixels is nearly uniform. If the 3D distance sensor is used, three-dimensional coordinates of pixels on the acquired image may be accurately acquired. Thus, the map point information setting unit 42 may arbitrarily select a predetermined number (for example, three or more) of pixels separated by the predetermined distance or less from each target characteristic point on the acquired image, identify three-dimensional coordinates of the selected pixels based on the 3D positional information, and identify the types of detected characteristic points.

Return to FIG. 21. The priority calculating unit 47 calculates distortions (warpage) of shapes located near map points (characteristic points) whose types are physical corner points, and the priority calculating unit 47 calculates, based on the calculated distortions (warpage) of the shapes, priorities of the map points (characteristic points) whose types are the physical corner points. The priorities may be calculated using the method described in the second embodiment. Specifically, the priority calculating unit 47 arbitrarily selects, for each of the physical corner points, a plurality of pixels separated from the predetermined distance or less from the physical corner point (target physical corner point) and arbitrarily selects combinations of predetermined numbers (for example, three) of characteristic points (map points) from among the selected pixels. The selected pixels may be pixels corresponding to map points (characteristic points).

Then, the priority calculating unit 47 detects positional relationships between the selected combinations of pixels and the target physical corner points based on the 3D positional information. Then, the priority calculating unit 47 calculates, for each of the target physical corner points, angles θ formed between a plane on which the target physical corner point and at least one pixel (corresponding point in the world coordinate system) are distributed and lines connecting the target physical corner point to pixels (corresponding points in the world coordinate system) that are not distributed on the plane, and the priority calculating unit 47 calculates the average of the angles for each of the target physical corner points. Specifically, the priority calculating unit 47 calculates distortions (warpage) of shapes located near the target physical corner points.

Then, the priority calculating unit 47 calculates priorities based on the calculated averages of the angles in accordance with the function F exemplified in FIG. 14. Specifically, as a shape located near a physical corner point is more similar to a plane, the priority calculating unit 47 calculates a higher priority for the physical corner point.

The priority calculating unit 47 may calculate, for each of the target physical corner points, a distortion of a shape located near the target physical corner point by approximating, to a plane, the target physical corner point and pixels (corresponding points in the world coordinate system) separated by the predetermined distance or less from the target characteristic point and calculating the average of deviations from the approximated plane, the sum of the deviations, the sum of the square of the deviations, or the like.

Figure 23:
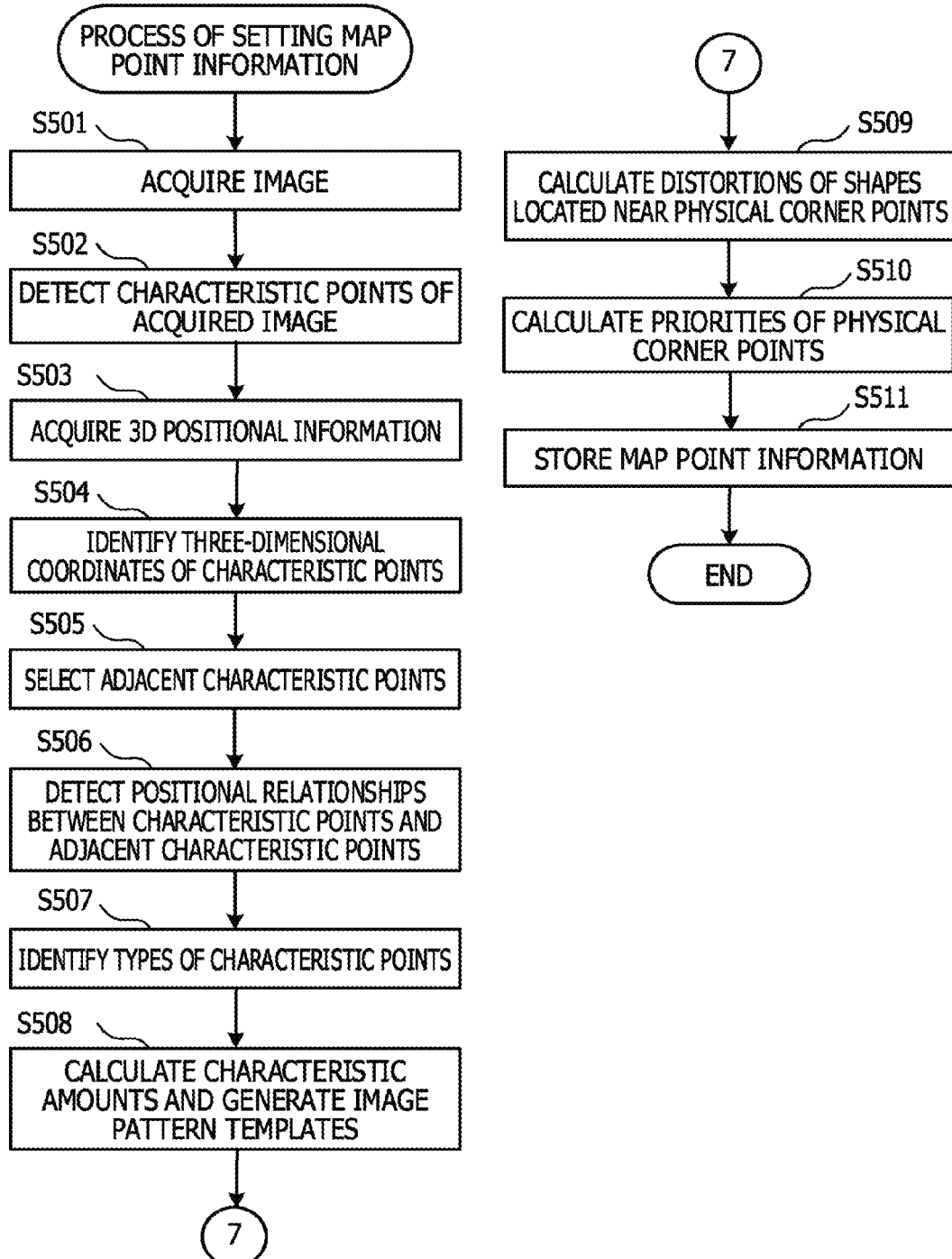
FIG. 23 is an example of a flowchart describing a process of setting map point information according to the fourth embodiment.

Next, the flow of a process of setting map point information according to the fourth embodiment is described with reference to FIG. 23. FIG. 23 is an example of a flowchart of the process of setting map point information according to the fourth embodiment. The process of setting map point information is started by a predetermined operation (the activation of the specific application or the like) performed by the user through the operating unit (not illustrated) as a trigger, for example. The process of setting map point information may be repeatedly executed at predetermined time intervals or every time an image is acquired.

The image acquiring unit 10 acquires an image and outputs the acquired image to the controlling unit 40 (in step S501). The characteristic point detecting unit 41 detects characteristic points of the input acquired image (in step S502). Then, the positional information acquiring unit 50 acquires the 3D positional information and outputs the acquired 3D positional information to the controlling unit 40 (in step S503).

Then, the map point information setting unit 42 identifies the three-dimensional coordinates of the detected characteristic points based on the input 3D positional information (in step S504). Then, the map point information setting unit 42 selects a predetermined number of characteristic points located adjacent to each of the detected characteristic points (in step S505) and detects, based on the 3D positional information, positional relationships between the characteristic points (target characteristic points) and characteristic points located adjacent to the target characteristic points (in step S506).

Then, the map point information setting unit 42 identifies the types of the detected characteristic points (in step S507). The map point information setting unit 42 calculates characteristic amounts of the detected characteristic points and generates image pattern templates for the detected characteristic points (in step S508).

Then, the priority calculating unit 47 calculates distortions of shapes located near map points (characteristic points) whose types are physical corner points (in step S509) and calculates, based on the calculated distortions of the shapes, priorities of the map points (characteristic points) whose types are the physical corner points (in step S510).

Then, the map point information setting unit 42 associates map point information including the priorities calculated by the priority calculating unit 47 with the identifiers of the map points whose types are the physical corner points and causes the map point information and the map point identifiers to be stored in the map point information storage unit 21 (in step S511). Then, the process is terminated.

According to the fourth embodiment, the communication device 1 detects characteristic points on an acquired image, identifies three-dimensional coordinates of the detected characteristic points based on the 3D positional information acquired by the 3D distance sensor, and thereby sets map points. Thus, map point information may be set in real time.

In addition, according to the fourth embodiment, the communication device 1 arbitrarily selects a plurality of pixels located near each of the detected characteristic points (detected points) and identifies the types of the characteristic points (detected points) based on positional relationships between the selected pixels (corresponding points in the world coordinate system) and the characteristic points (detected points).

Figure 24:
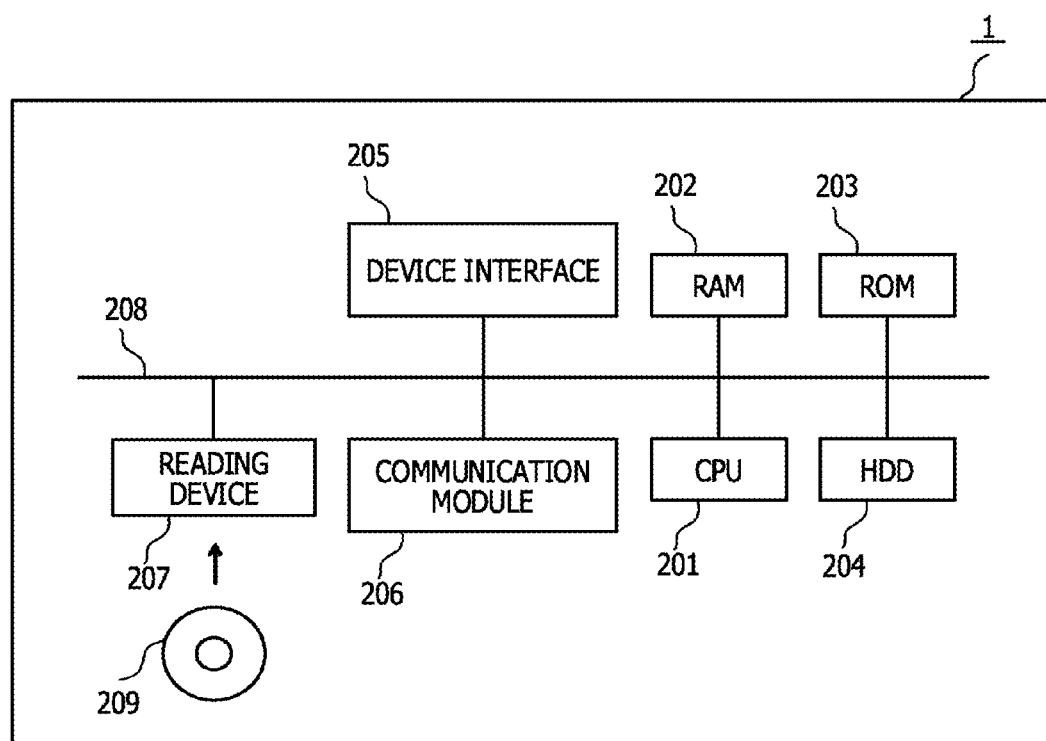
FIG. 24 is a diagram illustrating an example of a hardware configuration of a communication device according to each of the embodiments.

FIG. 24 is a diagram illustrating an example of a hardware configuration of a communication device 1 according to each of the first to fourth embodiments. The communication device 1 illustrated in FIG. 1 and the like may be achieved by various types of hardware illustrated in FIG. 24. In the example illustrated in FIG. 24, the communication device 1 includes a CPU 201, a RAM 202, a ROM 203, an HDD 204, a device interface 205, a communication module 206, and a reading device 207. The device interface 205 is connected to the camera, the display device, the 3D distance sensor, and the like. The hardware parts are connected to each other through a bus 208.

The CPU 201 loads the operation program stored in the HDD 204 into the RAM 202 and executes the various processes while using the RAM 202 as a working memory. The CPU 201 may achieve the functional units of the controlling unit 40 illustrated in FIG. 1 and the like by executing the operation program.

The aforementioned processes may be executed by distributing and storing the operation program to be used to execute the aforementioned operations to and in a computer-readable recording medium 209 such as a flexible disk, a compact disc-read only memory (CD-ROM), a digital versatile disc (DVD), or a magneto optical (MO) disc, reading the operation program by the reading device 207 of the communication device 1, and installing the operation program into a computer. In addition, the operation program may be stored in a disk device included in a server device on the Internet and downloaded into the computer of the communication device 1.

In each of the embodiments, another type of a storage device other than the RAM 202, the ROM 203, and the HDD 204 may be used. For example, the communication device 1 may include storage devices such as a content addressable memory (CAM), a static random access memory (SRAM), and a synchronous dynamic random access memory (SDRAM).

In each of the embodiments, the hardware configuration of the communication device 1 may be different from the configuration illustrated in FIG. 24, and the communication device 1 may include hardware other than the standards illustrated in FIG. 24 and the types illustrated in FIG. 24.

For example, the functional units included in the controlling unit 40 of the communication device 1 and illustrated in FIG. 1 and the like may be achieved by a hardware circuit. Specifically, the functional units included in the controlling unit 40 and illustrated in FIG. 1 and the like may be achieved by a reconfigurable circuit such as a field programmable gate array (FPGA), an application specific integrated circuit (ASIC), or the like, instead of the CPU 201. The functional units may be achieved by the CPU 201 and the hardware circuit.

The embodiments and the modified examples of the embodiments are described above. The embodiments, however, are not limited to the aforementioned embodiments and may be understood to include the modified examples of the embodiments and alternative examples. For example, it may be understood that the constituent elements may be modified and detailed in the embodiments without departing from the gist and scope of the embodiments. In addition, it may be understood that various embodiments may be achieved by combining the constituent elements disclosed in the embodiments. Furthermore, a person skilled in the art may understand that various embodiments may be achieved by removing some of all the constituent elements described in the embodiments, replacing some of all the constituent elements described in the embodiments with other constituent elements, or adding some constituent elements to the constituent elements described in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An estimation method executed by a computer, the estimation method comprising:
    extracting, from an image, a plurality of characteristic points satisfying a certain requirement regarding changes in gray levels between the plurality of characteristic points and surrounding points;
    identifying, as map points from the plurality of characteristic points, characteristic points existing on planes, by excluding corners of an object depicted on the image;
    extracting, from another image, another plurality of characteristic points satisfying the certain requirement;
    executing matching of the another plurality of characteristic points with the map points based on a region including the map points; and
    estimating, based on results of the matching, a position and an orientation of an imaging device while the another image is captured.

2. The estimation method according to claim 1, wherein the identifying includes:
    determining, for each of the plurality of characteristic points, whether or not a target characteristic point from among the plurality of characteristic points and adjacent characteristic points are distributed on a same plane in the image, and
    identifying, for each of the plurality of characteristic points, the target characteristic point as a map point from among the map points when the target characteristic point and the adjacent characteristic points are distributed on the same plane, and
    the adjacent characteristic points are located adjacent to the target characteristic point.

3. The estimation method according to claim 1, further comprising:
    storing image data of the region including the map points into a storage unit, and
    wherein the matching is executed using the image data stored in the storage unit when the another image is acquired.

4. The estimation method according to claim 1, further comprising:
    identifying, as another map point, a characteristic point from among the plurality of characteristic points, the characteristic point existing at a corner of the object; and
    storing the map points and the another map point into the storage unit while distinguishing the map points from the another map point.

5. The estimation method according to claim 4, wherein the executing of the matching includes:
    executing matching of the map points with the another plurality of characteristic points, and
    executing another matching using the another map point when the number of successfully matched characteristic points that have been subjected to the matching is smaller than a certain value.

6. The estimation method according to claim 5, wherein the another matching is executed based on priorities of another map points including the another map point, and
    the priorities are calculated for the another map points based on a positional relationship between a first map point from among the another map points and a second map point which is separated by a certain distance or less from the first map point.

7. The estimation method according to claim 5, wherein the estimating is executed using a successfully matched characteristic point, from among the another plurality of characteristic points, which has been subjected to the matching or the another matching.

8. The estimation method according to claim 7, wherein the estimating is executed using a first group which succeeds in the matching and a second group which succeeds in the another matching, while a weight added to the first group is larger than another weight added to the second group.

9. The estimation method according to claim 3, wherein three-dimensional positions of the map points are acquired from the imaging device provided with a three-dimensional distance sensor.

10. The estimation method according to claim 1, wherein the another image is captured following the image, and the image is captured by the imaging device.

11. An estimating device comprising:
    a memory; and
    a processor coupled to the memory and configured to:
        extract, from an image, a plurality of characteristic points satisfying a certain requirement regarding changes in gray levels between the plurality of characteristic points and surrounding points,
        identifying, as map points from the plurality of characteristic points, characteristic points existing on planes, by excluding corners of an object depicted on the image,
        extract, from another image, another plurality of characteristic points satisfying the certain requirement, execute matching of the another plurality of characteristic points with the map points based on a region including the map points, and estimate, based on results of the matching, a position and an orientation of an imaging device while the another image is captured.

12. The estimating device according to claim 11, wherein the processor is configured to:

determine, for each of the plurality of characteristic points, whether or not a target characteristic point from among the plurality of characteristic points and adjacent characteristic points are distributed on a same plane in the image, and identify, for each of the plurality of characteristic points, the target characteristic point as a map point from among the map points when the target characteristic point and the adjacent characteristic points are distributed on the same plane, and the adjacent characteristic points are located adjacent to the target characteristic point.

13. The estimating device according to claim 11, wherein the processor is configured to store image data of the region including the map points into a storage unit, and the matching is executed using the image data stored in the storage unit when the another image is acquired.

14. The estimating device according to claim 11, wherein the processor is configured to:

identify, as another map point, a characteristic point from among the plurality of characteristic points, the characteristic point existing at a corner of the object, and store the map points and the another map point into the storage unit while distinguishing the map points from the another map point.

15. The estimating device according to claim 14, wherein the processor is configured to:

execute matching of the map points with the another plurality of characteristic points, and execute another matching using the another map point when the number of successfully matched characteristic points that have been subjected to the matching is smaller than a certain value.

16. The estimating device according to claim 15, wherein the another matching is executed based on priorities of another map points including the another map point, and the priorities are calculated for the another map points based on a positional relationship between a first map point from among the another map points and a second map point which is separated by a certain distance or less from the first map point.

17. The estimating device according to claim 15, wherein the processor is configured to estimate the position and the orientation of the imaging device using a successfully matched characteristic point, from among the another plurality of characteristic points, which has been subjected to the matching or the another matching.

18. The estimating device according to claim 17, wherein the processor is configured to estimate the position and the orientation of the imaging device using a first group which succeeds in the matching and a second group which succeeds in the another matching, while a weight added to the first group is larger than another weight added to the second group.

19. The estimating device according to claim 13, wherein three-dimensional positions of the map points are acquired from the imaging device provided with a three-dimensional distance sensor.

20. An estimating device configured to execute matching of a plurality of characteristic points extracted from an image with a plurality of map points and estimate a position and an orientation of a camera capturing the image, based on deviations of successfully matched characteristic points from among the characteristic points subjected to the matching from points obtained by projecting map points corresponding to the successfully matched characteristic points on the image, the estimating device comprising:

a memory; and a processor coupled to the memory and configured to:

identify shapes of regions each having a certain range and including a certain map point from among the plurality of map points, determine whether or not the shapes are planes, adjust rates of causing the plurality of map points to contribute to an estimation of the position and the orientation of the camera, and wherein the adjust rates of causing a map point included in a planar region to contribute to the estimation of the position and the orientation of the camera is larger than the adjust rate of causing another map point included in a non-planar region to contribute to the estimation of the position and the orientation of the camera.

* * * * *